(12) United States Patent
Ueda et al.

(10) Patent No.: US 11,057,473 B2
(45) Date of Patent: Jul. 6, 2021

(54) LINKAGE SYSTEM AND DEVICE CONTROL SERVER

(71) Applicant: SHARP KABUSHIKI KAISHA, Osaka (JP)

(72) Inventors: Toru Ueda, Sakai (JP); Masahiro Chiba, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 516 days.

(21) Appl. No.: 15/555,549

(22) PCT Filed: May 20, 2016

(86) PCT No.: PCT/JP2016/065072
§ 371 (c)(1),
(2) Date: Sep. 4, 2017

(87) PCT Pub. No.: WO2017/018032
PCT Pub. Date: Feb. 2, 2017

(65) Prior Publication Data
US 2018/0041586 A1 Feb. 8, 2018

(30) Foreign Application Priority Data
Jul. 24, 2015 (JP) .............................. JP2015-147240

(51) Int. Cl.
*H04L 29/08* (2006.01)
*G06F 13/00* (2006.01)
(Continued)

(52) U.S. Cl.
CPC ............ *H04L 67/125* (2013.01); *G06F 13/00* (2013.01); *H04L 12/2803* (2013.01); *H04L 41/0803* (2013.01); *H04L 43/0817* (2013.01)

(58) Field of Classification Search
None
See application file for complete search history.

(56) References Cited

U.S. PATENT DOCUMENTS 8,667,100 B2 * 3/2014 Dixon ................. H04L 65/1073
709/221
2002/0055794 A1 5/2002 Takae et al.
(Continued)

FOREIGN PATENT DOCUMENTS

| CN | 101115315 A | 1/2008 |
|---|---|---|
| CN | 104142659 A | 11/2014 |

(Continued)

OTHER PUBLICATIONS

Non-Final Office Action dated Aug. 30, 2019 issued in U.S. Appl. No. 15/757,813.

*Primary Examiner* — Younes Naji
(74) *Attorney, Agent, or Firm* — ScienBiziP, P.C.

(57) ABSTRACT

In the present disclosure, an appropriate control-target device is caused to carry out an operation without the control-target device being designated. A linking system (7) includes: a linking server (1); a device controlling server (2); one or more devices (4); and an information providing server (5). In a case where the device controlling server (2) has received from the linking server (1) an instruction for carrying out an operation in accordance with a linking rule, the device controlling server transmits (2) a command to carry out the operation to at least one device, the at least one device having been identified by the device controlling server (2) from among the one or more devices (4) in accordance with a user specified in the linking rule. The information providing server (5) transmits, to the linking server (1), notification of a trigger for the operation.

8 Claims, 26 Drawing Sheets

(51) Int. Cl.
  *H04L 12/26* (2006.01)
  *H04L 12/28* (2006.01)
  *H04L 12/24* (2006.01)

(56) References Cited

U.S. PATENT DOCUMENTS

| | | | |
|---|---|---|---|
| 2003/0087665 A1 | 5/2003 | Tokkonen | |
| 2008/0235731 A1* | 9/2008 | Bryant | H04N 21/4334 725/44 |
| 2011/0173668 A1* | 7/2011 | Rooks | H04L 12/2834 725/80 |
| 2012/0065749 A1* | 3/2012 | Hunter | H04L 12/282 700/83 |
| 2012/0131185 A1 | 5/2012 | Petersen et al. | |
| 2012/0303137 A1* | 11/2012 | Schoeller | H04L 12/282 700/1 |
| 2014/0067131 A1* | 3/2014 | Park | D06F 34/28 700/275 |
| 2014/0108019 A1* | 4/2014 | Ehsani | H04L 12/282 704/275 |
| 2014/0180488 A1* | 6/2014 | Hirayama | H04L 12/283 700/295 |
| 2014/0317410 A1 | 10/2014 | Yamaguchi et al. | |
| 2015/0094825 A1 | 4/2015 | Kinoshita et al. | |
| 2016/0182704 A1 | 6/2016 | Minezawa et al. | |
| 2016/0277203 A1 | 9/2016 | Jin et al. | |
| 2016/0323977 A1* | 11/2016 | Sun | H05B 47/11 |
| 2016/0378080 A1* | 12/2016 | Uppala | G10L 15/22 700/275 |
| 2018/0028114 A1* | 2/2018 | Cronin | A61B 5/1118 |
| 2018/0173409 A1* | 6/2018 | Usuki | G05B 15/02 |

FOREIGN PATENT DOCUMENTS

| | | | | |
|---|---|---|---|---|
| JP | 2002-92194 A | | 3/2002 | |
| JP | 2002092194 A | * | 3/2002 | H04L 12/28 |
| JP | 2004-145875 A | | 5/2004 | |
| JP | 2006-342978 A | | 12/2006 | |
| JP | 2008-033618 A | | 2/2008 | |
| JP | 2010-152708 A | | 7/2010 | |
| JP | 2014-211873 A | | 11/2014 | |
| JP | 2014-216884 A | | 11/2014 | |
| JP | 2015-70430 A | | 4/2015 | |
| JP | 2015-144027 A | | 8/2015 | |

* cited by examiner

FIG. 5

| USER ID | USER NAME | PASSWORD |
|---------|-----------|----------|
| U0001 | Dad | 1234 |
| U0002 | Mom | 2345 |
| U0003 | Jun | 5678 |
| ... | ... | ... |

FIG. 6

| GROUP ID | GROUP NAME | MEMBER USER |
|---|---|---|
| G0001 | Person A's Family | U0001, U0002, U0003 |
| G0002 | Person B's Family | U0011, U0012 |
| ... | ... | ... |

FIG. 7

| DEVICE ID | DEVICE TYPE | MANUFACTURER | ACTION-COMPATIBLE FUNCTION | REGISTERED NAME | OWNER | GROUP | PERMITTED USERS |
|---|---|---|---|---|---|---|---|
| T2125 | AIR CONDITIONER | COMPANY S | VOICE OUTPUT FUNCTION | Living Room Air Conditioner | Dad | G0001 | U0001, U0002 |
| T2126 | AIR CONDITIONER | COMPANY S | VOICE OUTPUT FUNCTION, DISPLAY FUNCTION | Bedroom Air conditioner | Dad | G0001 | U0001, U0002 |
| T2127 | VACUUM CLEANER | COMPANY Y | VOICE OUTPUT FUNCTION | Robot Vacuum | Mom | G0001 | U0001, U0002, U0003 |
| T2129 | IN-VEHICLE DEVICE | COMPANY T | DISPLAY FUNCTION | Car | Person B | G0002 | U0011 |
| ... | ... | ... | ... | ... | ... | ... | ... |

FIG. 20

LINKAGE SYSTEM AND DEVICE CONTROL SERVER

TECHNICAL FIELD

The present invention relates to, for example, (i) a server which provides a service and (ii) a linking server which provides a linking service for linking a plurality of services.

BACKGROUND ART

A system which links a plurality of network services is known as conventional art. For example, Patent Literature 1 below discloses an intermediation method which facilitates operations for user registration during linking of a plurality of network services.

CITATION LIST

Patent Literature

[Patent Literature 1] Japanese Patent Application Publication, Tokukai, No. 2014-211873 (Publication Date: Nov. 13, 2014)

SUMMARY OF INVENTION

Technical Problem

Using conventional art such as that described above makes it possible for a service for controlling operations of a device to cause the device to carry out a predetermined operation, the service being triggered to do so by provision of information from another service. For example, such conventional art makes it possible to add a drying cycle to a user-scheduled operation of a washing machine when a weather information providing service provides information indicating that it will rain.

Unfortunately, conventional art such as that described above does not take into account a case where there are a plurality of devices which can carry out a predetermined operation. For example, with the above-described conventional art, in a case where the user has a plurality of similar devices (for example, air conditioners), it is unclear whether each of the devices should carry out the predetermined operation. Furthermore, in the case of a configuration where the user is able to select a device to carry out a predetermined operation, the user is forced to carry out a troublesome operation for selecting the device. Such an operation becomes a burden on the user particularly in a case where the user owns a significant number of devices. In a case where the user is not aware of which devices are able to carry out a desired operation, there is the risk that linking may fail due to the user erroneously designating a device which cannot carry out the operation.

The present invention was made in view of the above problems. An object of an embodiment of the present invention is to provide a linking system and the like which make it possible to cause an appropriate control-target device to carry out an action desired by the user without requiring the user to perform a troublesome operation for designating the control-target device.

Solution to Problem

In order to solve the above problems, a linking system in accordance with an aspect of the present invention includes: an information providing server; a device controlling server, a linking server; and one or more control-target devices, the linking server being configured to cause an operation to be carried out in accordance with a linking rule in which a trigger is associated with the operation, the trigger being predetermined information being transmitted from the information providing server to the such that, in a case where the device controlling server has received from the linking server an instruction for carrying out the operation in accordance with the linking rule, the device controlling server transmits a command to carry out the operation to at least one control-target device, the at least one control-target device having been identified by the device controlling server from among the one or more control-target devices in accordance with at least one of (i) the operation specified in the linking rule and (ii) a user specified in the linking rule.

In order to solve the above problems, a device controlling server in accordance with an aspect of the present invention is a device controlling server for causing one or more control-target devices to carry out an operation which is predetermined, the device controlling server being controlled by a linking server in accordance with a linking rule in which a trigger is associated with the operation, the trigger being predetermined information being transmitted from an information providing server to the linking server, the device controlling server including: a device identifying section configured such that, in a case where the device identifying section has received from the linking server an instruction for carrying out the operation in accordance with the linking rule, the device identifying section identifies those of the one or more control-target devices which correspond to at least one of (i) the operation specified in the linking rule and (ii) a user specified in the linking rule; and a device controlling section configured to transmit, to those of the one or more control-target devices which have been identified by the device identifying section, a command to carry out the operation.

In order to solve the above problems, a control-target device in accordance with an aspect of the present invention is a control-target device which carries out an operation in accordance with control by a device controlling server, the device controlling server being controlled by a linking server in accordance with a linking rule in which a trigger is associated with the operation, the trigger being predetermined information being transmitted from an information providing server to the linking server, the device controlling server being configured such that, in a case where the device controlling server has received from the linking server an instruction for carrying out the operation in accordance with the linking rule, the device controlling server transmits a command to carry out the operation to at least one control-target device, the at least one control-target device having been identified by the device controlling server from among one or more control-target devices in accordance with at least one of (i) the operation specified in the linking rule and (ii) a user specified in the linking rule, the control-target device including: an operation execution section configured to carry out the operation in accordance with the control by the device controlling server, the control by the device controlling server being in accordance with the linking rule.

In order to solve the above problems, a terminal device in accordance with an aspect of the present invention is a terminal device which communicates with a linking server, the linking server being configured to control a device controlling server, in accordance with a linking rule in which a trigger is associated with an operation, so that the device controlling server causes a control-target device to carry out the operation, the trigger being predetermined information being transmitted from an information providing server to the linking server, the terminal device including a link setting section configured to cause the linking server to generate the linking rule, in which linking rule the control-target device to carry out the operation is not specified, the device controlling server being configured to identify, as a device to carry out the operation, a control-target device which corresponds to at least one of (i) the operation specified in the linking rule and (ii) a user specified in the linking rule.

Advantageous Effects of Invention

The above aspects of the present invention bring about the effect of making it possible to cause an appropriate control-target device to carry out an operation desired by the user without requiring the user to perform a troublesome operation for designating the control-target device.

BRIEF DESCRIPTION OF DRAWINGS

FIG. 5 is a diagram illustrating an example of user management information.

FIG. 6 is a diagram illustrating an example of group management information.

FIG. 7 is a diagram illustrating an example of device management information.

FIG. 20 is a diagram illustrating Embodiment 8 of the present invention and is a diagram illustrating another example of an operation screen which allows a user to set an action.

DESCRIPTION OF EMBODIMENTS

Embodiment 1

The following description will discuss, with reference to FIGS. 1 to 12, an embodiment of the present invention.

[Overview of System]

Figure 3:
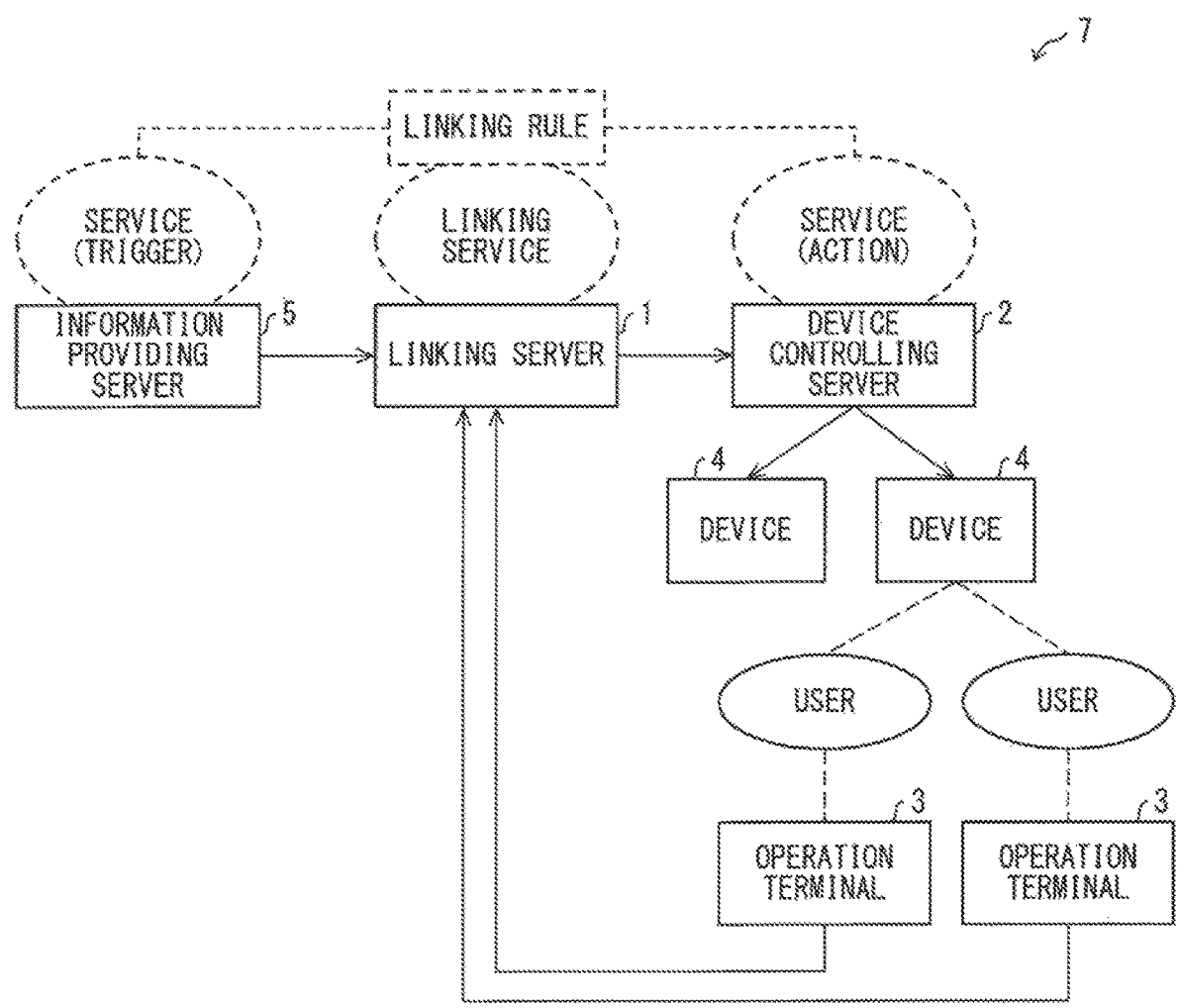
FIG. 3 is a diagram schematically illustrating a linking system in accordance with Embodiment 1 of the present application.

Discussed first, with reference to FIG. 3, is an overview of a linking system in accordance with Embodiment 1. FIG. 3 is a diagram schematically illustrating a linking system 7. The linking system 7 provides a linking service for linking a plurality of services.

Services to be linked in the linking system 7 can be classified into trigger services and action services. In other words, in the linking system 7, in a case where a predetermined event relating to a trigger service occurs, an action service is caused to carry out a predetermined action. This makes it possible to provide a variety of linking services in which differing services are combined.

Discussed in Embodiment 1 is an example in which (i) the trigger service is a service for providing notification of a user's location information, and (ii) the action service is a service for causing a device (control-target device) 4 to carry out a predetermined operation. More specifically, the action service is for causing the device to output voice audio. Note that the trigger service and the action service are not limited to these services.

As illustrated, the linking system 7 includes (i) a linking server 1 for providing the linking service, (ii) a device controlling server 2 for providing the action service, (iii) an operation terminal (terminal device) 3 which is used for, for example, setting a linking rule, (iv) the device 4 which is controlled by the device controlling server 2, and (v) an information providing server 5 for providing the trigger service. The linking rule associates a trigger with an action in the linking service. The linking rule is generated by the linking server 1.

The information providing server 5 notifies the linking server 1 of the user's location information. In a case where the linking server 1 is notified of predetermined location information, the linking server 1 causes the device controlling server 2 to cause the device 4 to output predetermined voice audio. This makes it possible, for example, to cause the device 4, being installed in the user's home, to say "Welcome home" to the user when the user returns home.

The device 4 need only be a device controlled by the device controlling server 2 and is not particularly limited. In Embodiment 1, however, the device 4 is exemplarily described as being a home-use electrical appliance (hereinafter, "home appliance"). As in the illustrated example, the device 4 may be shared by a plurality of users.

Each user has an operation terminal 3 which can be used to set a linking rule such that controlling an operation of the device 4 is set as an action. The linking system 7 is configured such that the user can easily select the device 4 during setting the linking rule, as the device 4 is related to a group to which the user belongs. This is discussed later in detail.

[Linking Rule Setting and Processing after Setting]

Figure 4:
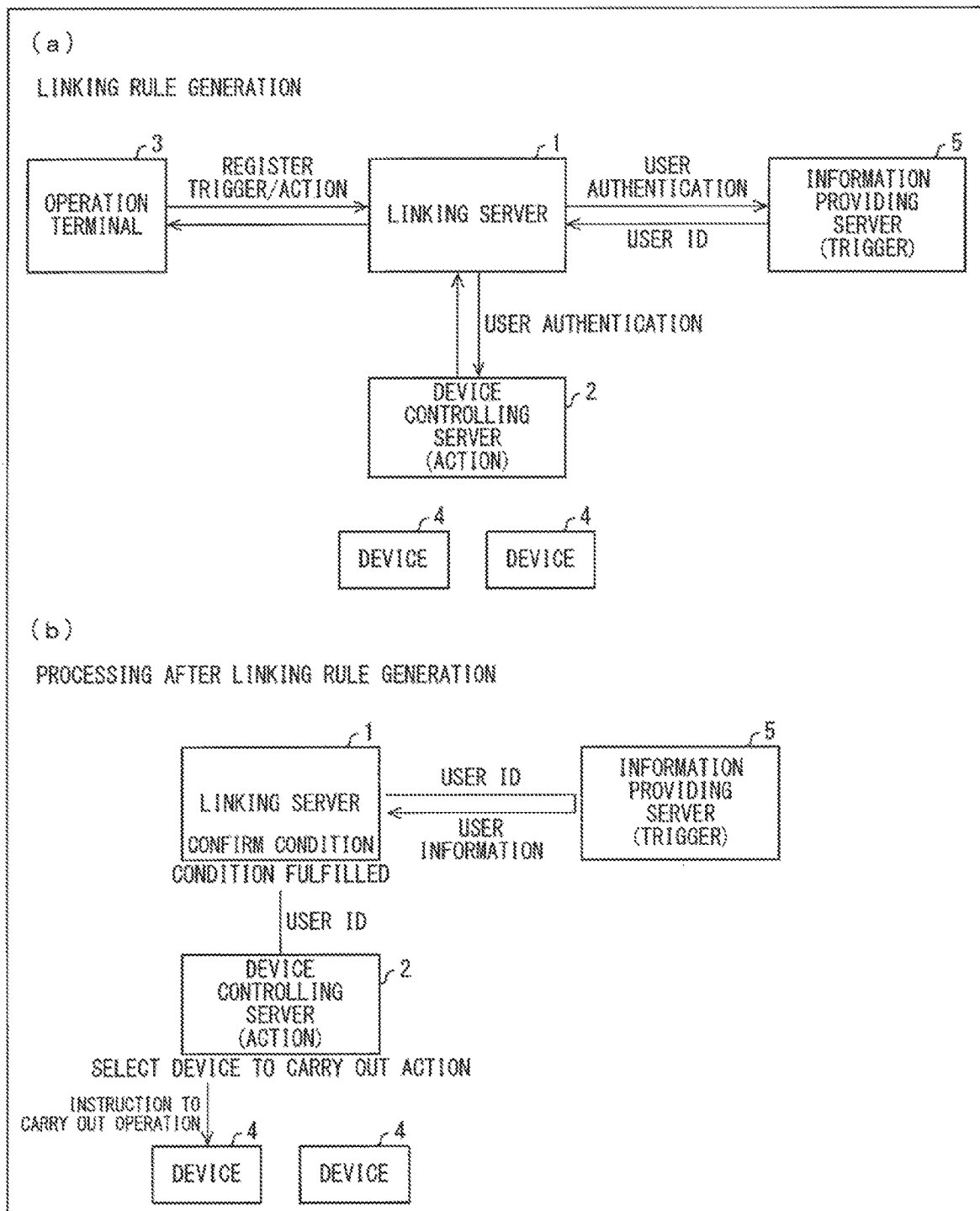
FIG. 4 is a diagram schematically illustrating (i) setting of a linking rule in the linking system and (ii) processing after the setting.

Next, with reference to FIG. 4, the following description will discuss (i) setting of the linking rule and (ii) processing after the setting. FIG. 4 is a diagram schematically illustrating (i) setting of a linking rule and (ii) processing after the setting. Note that prerequisites for setting the linking rule are that the user has registered to use each service to be linked and has obtained a user ID (user account) and password for using each service. The respective user IDs for each service to be linked may be the same or may differ. Another prerequisite, with regard to the service (device controlling service) to be provided by the device controlling server 2, is that the device 4 (voice outputting home appliance) has already been registered to be controlled by the service.

During setting of the linking rule, the operation terminal 3 is used to set a trigger service and an action service in the linking server 1, as illustrated in (a) of FIG. 4. Specifically, first, the operation terminal 3 carries out user authentication for the trigger service via the linking server 1. More specifically, the operation terminal 3 transmits, via the linking server 1 and to the information providing server 5, the user ID and password for the service. Note that the operation terminal 3 may alternatively carry out user authentication that is not via the linking server 1. Once the authentication has succeeded, the information providing server 5 transmits, to the linking server 1, the user ID (user identification information) of the successfully authenticated user. This makes it possible, from this point onward, for the linking server 1 to use the user ID to obtain, from the information providing server 5, information relating to the user (this information is hereinafter referred to as "user information").

The operation terminal 3 selects a trigger condition (an event that triggers an action) which utilizes the service provided by the information providing server 5. The operation terminal 3 then notifies the linking server 1 of such. The present embodiment assumes a case where the service provided by the information providing server 5 is a location information service which provides notification of location information indicating the user's current location. As such, the trigger condition can be set to be, for example, the user's current location being a predetermined location (for example, the user's home, or the station nearest to the user's home).

Furthermore, the operation terminal 3 carries out user authentication for the action service, in the same manner as above. Once the authentication has succeeded, the device controlling server 2 transmits, to the linking server 1, the user ID of the successfully authenticated user. This makes it possible, from this point onward, for the linking server 1 to use the user ID to obtain, from the device controlling server 2, information relating to the user.

For example, the linking server 1 can use the user ID to obtain, from the device controlling server 2, (i) a list of members of a group to which the user having the user ID belongs and (ii) a list of devices 4 which the members can set to be controlled (hereinafter referred to as a "device list"). The group is used for user management by the device controlling server 2. For example, members of a family can be managed as a group. The linking server 1 can transmit the member list and the device list it has received to the operation terminal 3 to be displayed thereon. This makes it possible for the user of the operation terminal 3 to easily carry out a setting not only for an action relating to the authenticated user, but also for an action relating to other users belonging to the same group as the authenticated user.

The operation terminal 3 notifies the linking server 1 of a selected member, a selected device 4, and the processing (action) that the device 4 is to carry out. The linking server 1 generates a linking rule by associating the action with the trigger condition described above.

Note that in the setting of the action, the operation terminal 3 may omit selection of the device 4. In this way, it is possible to generate a linking rule which causes the device 4 to carry out an operation even if the device 4 has not been selected. This is one of the main characteristic points of the linking system 7.

The following description will discuss, with reference to (b) of FIG. 4, processing after the linking rule has been set. Once the linking rule has been set, the linking server 1 obtains user information from the information providing server 5 in a periodic manner (for example, every 15 minutes). The linking server 1 confirms, in accordance with the user information thus obtained, whether or not the trigger condition has been fulfilled. Once the linking server 1 determines that the condition has been fulfilled, the action of the linking rule is carried out. Specifically, the linking server 1 notifies the device controlling server 2 of the user ID (user ID for the device controlling service) and a device ID of the device 4 to be controlled. The linking server 1 may also concurrently provide notification of (i) the processing to be carried out by the device 4 and (ii) details of the processing (for example, the content of voice output).

The device controlling server 2 similarly transmits, to the device 4 having the device ID of the notification from the linking server 1, an instruction to carry out an operation. The device controlling server 2 thus causes the device 4 to carry out the action of the linking rule as the service to be provided to the user having the user ID of the notification from the linking server 1.

In a case where the device 4 is not selected during the setting of the action, the linking server 1 transmits, to the device controlling server 2, the user ID (user ID for the device controlling service) and details of the action. In doing so, the linking server 1 may also transmit, to the device controlling server 2, (i) information indicating that the device 4 has not been selected, (ii) information indicating that any device may carry out the action, or (iii) instructions to select the device 4. In such a case, out of the devices 4 corresponding to the user having the received user ID, the device controlling server 2 selects, as recipients of a command to carry out the action, those of the devices 4 which are capable of carrying out the action. The device controlling server 2 then causes the device(s) 4 selected thusly to carry out the action by transmitting thereto the command to carry out the action.

[Apparatus Configuration (Linking Server and Device Controlling Server)]

Figure 1:
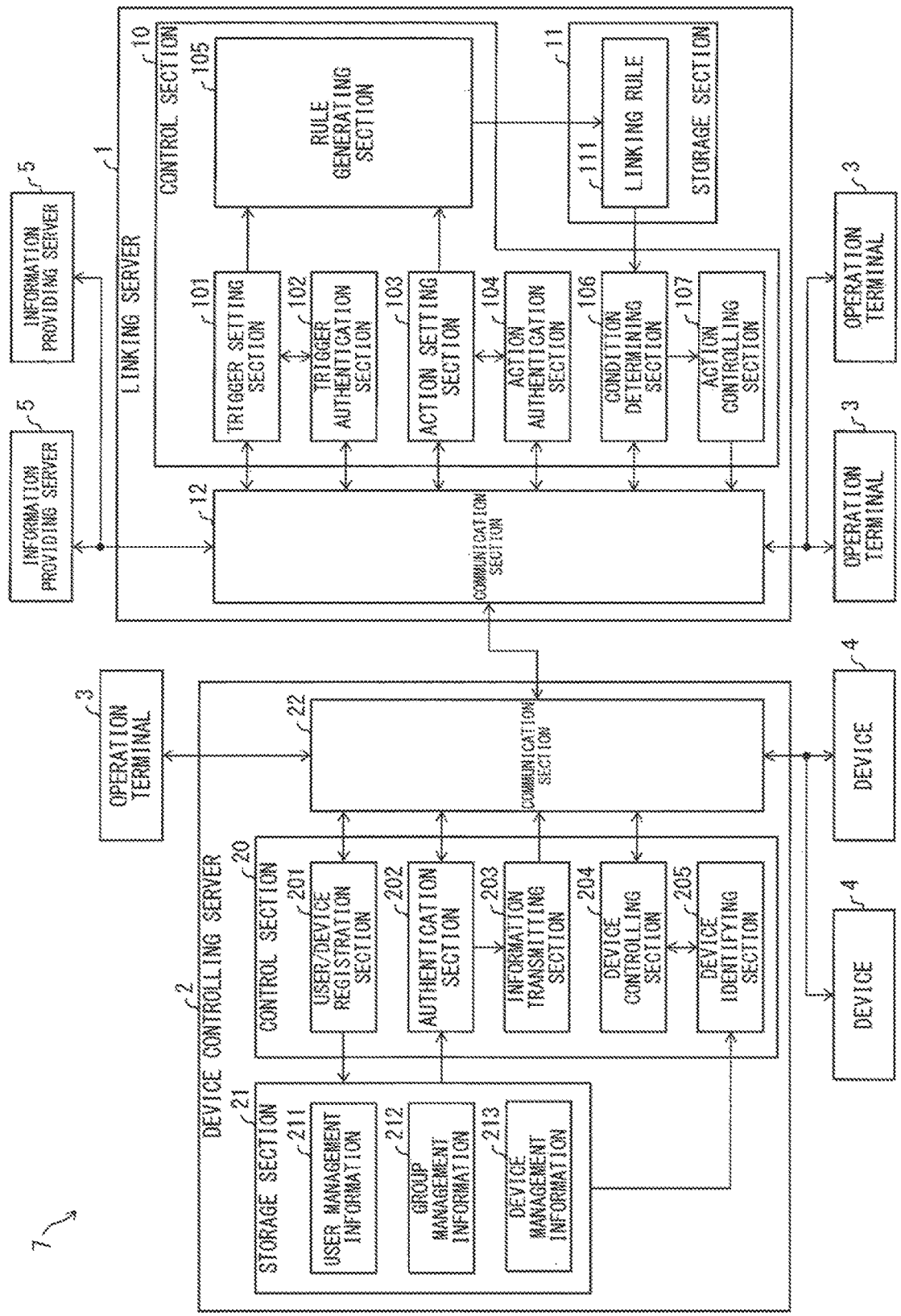
FIG. 1 is a block diagram illustrating an example configuration of main parts of a linking server and a device controlling server in accordance with Embodiment 1 of the present invention.

Next, with reference to FIG. 1, the following description will discuss respective configurations of the linking server 1 and the device controlling server 2. FIG. 1 is a block diagram illustrating an example configuration of main parts of the linking server 1 and the device controlling server 2. The linking server 1 will be discussed first, followed by the device controlling server 2.

[Configuration of Linking Server]

As illustrated, the linking server 1 includes (i) a control section 10 for comprehensively controlling each section of the linking server 1, (ii) a storage section 11 for storing various data used by the linking server 1, and (iii) a communication section 12 for allowing the linking server 1 to communicate with other devices. Note that although FIG. 1 illustrates an example in which a single communication section 12 is used for communication with the device controlling server 2, the operation terminal 3, and the information providing server 5, communication may also be carried out via differing communication sections (communication interfaces) in accordance with the device to be communicated with.

The control section 10 includes a trigger setting section 101, a trigger authentication section 102, an action setting section 103, an action authentication section 104, a rule generating section 105, a condition determining section 106, and an action controlling section 107. The storage section 11 stores a linking rule 111.

The trigger setting section 101 carries out processing relating to setting a trigger for a linking rule. The trigger authentication section 102 carries out authentication for the service selected in the setting of the trigger by the trigger setting section 101. Successful authentication makes it possible for the linking server 1 to obtain, from the trigger service, information related to the authenticated user (in this example, the trigger service is the location information service provided by the information providing server 5).

The action setting section 103 carries out processing relating to setting an action for the linking rule. The action authentication section 104 carries out authentication for the service selected in the setting of the action by the action setting section 103. Successful authentication makes it possible for the action setting section 103 to obtain, from the action service, information related to the authenticated user (in this example, the action service is the device controlling service provided by the device controlling server 2). The action setting section 103 then obtains, from the device controlling server 2, (i) a list of members (including the authenticated user) of the group to which the authenticated user belongs and (ii) device list which lists devices 4 related to the members. The action setting section 103 then causes the operation terminal 3 to display (i) information indicating the members included in the member list thus obtained and (ii) information indicating the devices 4 included in the device list. The action setting section 103 thus prompts the user of the operation terminal 3 (the user who will set the linking rule) select a desired member and a desired device 4. The action setting section 103 then sets (i) a selected device 4 as the device to carry out the action and (ii) an action to be carried out for a selected member.

The rule generating section 105 generates the linking rule by associating (i) the trigger condition set by the trigger setting section 101 with (ii) the action set by the action setting section 103. As described above, the user can select (i) a member of the group to which the authenticated user belongs and (ii) a device 4 related to the member. As such, the rule generating section 105 can generate not only a linking rule in which an operation is carried out by a device 4 related to the authenticated user, but also a linking rule in which an operation is carried out by a device 4 related to the group to which the authenticated user belongs.

The condition determining section 106 determines whether or not the trigger condition included in the linking rule has been fulfilled. Once the condition determining section 106 determines that the condition has been fulfilled, the condition determining section 106 notifies the action controlling section 107 of details of the action of the linking rule.

The action controlling section 107 causes the action service to carry out the action set in the linking rule. Specifically, the action controlling section 107 notifies the device controlling server 2 of the action and causes the device controlling server 2 to cause the device 4 to carry out the action.

The linking rule 111 is a rule which links the trigger service with the action service. The linking rule 111 is generated by the rule generating section 105 as described above. The linking rule 111 includes (i) information indicating the trigger condition, (ii) information indicating the device 4 which will be caused to carry out the action, and (iii) information indicating the operation which the device 4 will be caused to carry out.

[Configuration of Device Controlling Server]

As illustrated, the device controlling server 2 includes (i) a control section 20 for comprehensively controlling each section of the device controlling server 2, (ii) a storage section 21 for storing various data used by the device controlling serve 2, and (iii) a communication section 22 for allowing the device controlling server 2 to communicate with other devices. Note that although FIG. 1 illustrates an example in which a single communication section 22 is used for communication with the linking server 1, the operation terminal 3, and the device 4, communication may also be carried out via differing communication sections (communication interfaces) in accordance with the device to be communicated with.

The control section 20 includes a user/device registration section 201, an authentication section 202 (information receiving section), an information transmitting section 203, a device controlling section 204, and a device identifying section 205. The storage section 21 stores user management information 211, group management information 212, and device management information 213.

The user/device registration section 201 carries out processing relating to registering the user and the device 4 with the device controlling service. Registering the user and the device 4 with the device controlling service makes it possible for the user to use the device controlling service to control an operation of the device 4 registered with the device controlling service. Information relating to the registered user is stored in the storage section 21 as the user management information 211 and the group management information 212. Information relating to the registered device is stored in the storage section 21 as the device management information 213.

The authentication section 202 carries out processing which relates to authentication performed when a device information service is to be used. Specifically, the authentication section 202 prompts the user attempting to use the device information service to input a user ID (an ID assigned to the user at the time of user registration with the device information service and a password. The authentication section 202 compares the inputted user ID and password against the user ID and password which are registered in the user management information 211. If the respective user IDs and passwords match, the authentication section 202 determines that authentication was successful. If the respective user IDs and passwords do not match, the authentication section 202 determines that authentication was unsuccessful. In a case where the linking server notifies the authentication section 202 of a user ID, the authentication section 202 determines whether or not the user ID is registered in the user management information 211. In a case where the authentication section 202 determines that the user ID is registered in the user management information 211, the authentication section 202 transmits, to the information transmitting section 203, a member list and a device list which correspond with the user having the user ID. Once the information transmitting section 203 has received these lists, the information transmitting section 203 first transmits the member list to the linking server 1. Once the information transmitting section 203 receives notification, from the linking server 1, of which member was selected from the member list, the information transmitting section 203 then transmits, to the linking server 1, a device list corresponding to the member thus selected. In other words, the information transmitting section 203 transmits, to the linking server 1, a device list which lists devices relating to at least one of (i) the user successfully authenticated by the authentication section 202 and (ii) another member of the group to which the user belongs.

The device controlling section 204 controls operations of the device 4 which is registered with the device controlling service. Specifically, the device controlling section 204 controls operations of the device 4 in accordance with instructions from the user who is registered with the device controlling service. The device controlling section 204 also controls the device 4 in accordance with control by the linking server 1 so that the device 4 carries out an operation set in the linking rule.

In a case where the device identifying section 205 has received, from the linking server 1, an instruction for carrying out an operation in accordance with the linking rule, the device identifying section 205 identifies a device 4 corresponding to at least one of (i) an operation (action) specified in the linking rule and (ii) a user specified in the linking rule. The device controlling section 204 then transmits, to the device 4 identified by the device identifying section 205, a command to carry out the operation.

The user management information 211 is information for management of users registered with the device controlling service. The user management information 211 is generated by the user/device registration section 201 as described above. The user management information 211 can be, for example, information such as that illustrated in FIG. 5. FIG. 5 is a diagram illustrating an example of the user management information 211. As illustrated, the user management information 211 is in a table format in which user IDs, user names, and passwords are associated with each other. The user IDs are unique identification information assigned to each user of the device controlling service. The user names are names of users in the device controlling service and can be chosen by each user. The passwords are passwords required when using the device controlling service. Each user sets a password individually.

The group management information 212 is information for management of groups of users registered with the device controlling service. The group management information 212 is generated by the user/device registration section 201 in the same manner as the user management information 211. The group management information 212 can be, for example, information such as that illustrated in FIG. 6. FIG. 6 is a diagram illustrating an example of the group management information 212. As illustrated, the group management information 212 is in a table format in which group IDs, group names, and member users are associated with each other. The group IDs are unique identification information assigned to each group consisting of users of the device controlling service. The group names are names of groups in the device controlling service and can be chosen by a user of each group. The member users are users belonging to each group. In the illustrated example, the member users are indicated by the user IDs of users belonging to a group.

The device management information 213 is information for management of devices 4 registered with the device controlling service. The device management information 213 is generated by the user/device registration section 201 as described above. The user device management information 213 can be, for example, information such as that illustrated in FIG. 7. FIG. 7 is a diagram illustrating an example of the device management information 213. As illustrated, the device management information 213 is in a table format in which device IDs, device types, manufacturers, action-compatible functions, registered names, owners, groups, and permitted users are associated with each other. The device IDs are unique identification information assigned to each device 4 registered to be controlled by the device controlling service. The device types indicate the respective types of the devices 4. The manufacturers indicate respective manufacturers of the devices 4.

The action-compatible functions indicate which functions of the devices 4 can be used for an action in a linking rule. FIG. 7 shows, as examples of these functions, (i) a voice output function for outputting a message as voice audio and (ii) a display function for outputting a message via display. Those of the devices 4 which have a voice output function can be caused to carry out an action in which a message is outputted as voice audio. Those of the devices 4 which have a display function can be caused to carry out an action in which a message is displayed. Those of the devices 4 which have at least one of these functions can be caused to carry out an action in which a message is outputted.

The registered names are names of devices 4 in the device controlling service and can be chosen by each user. The owners are owners of the devices 4. The groups are groups to which the devices 4 belong. In the illustrated example, the groups are indicated by group IDs. Permitted users indicate users who can set controls for the device 4 and users who can be targets of operations (for example, voice output) carried out by the devices 4.

[Apparatus Configuration (Operation Terminal and Device)]

Figure 2:
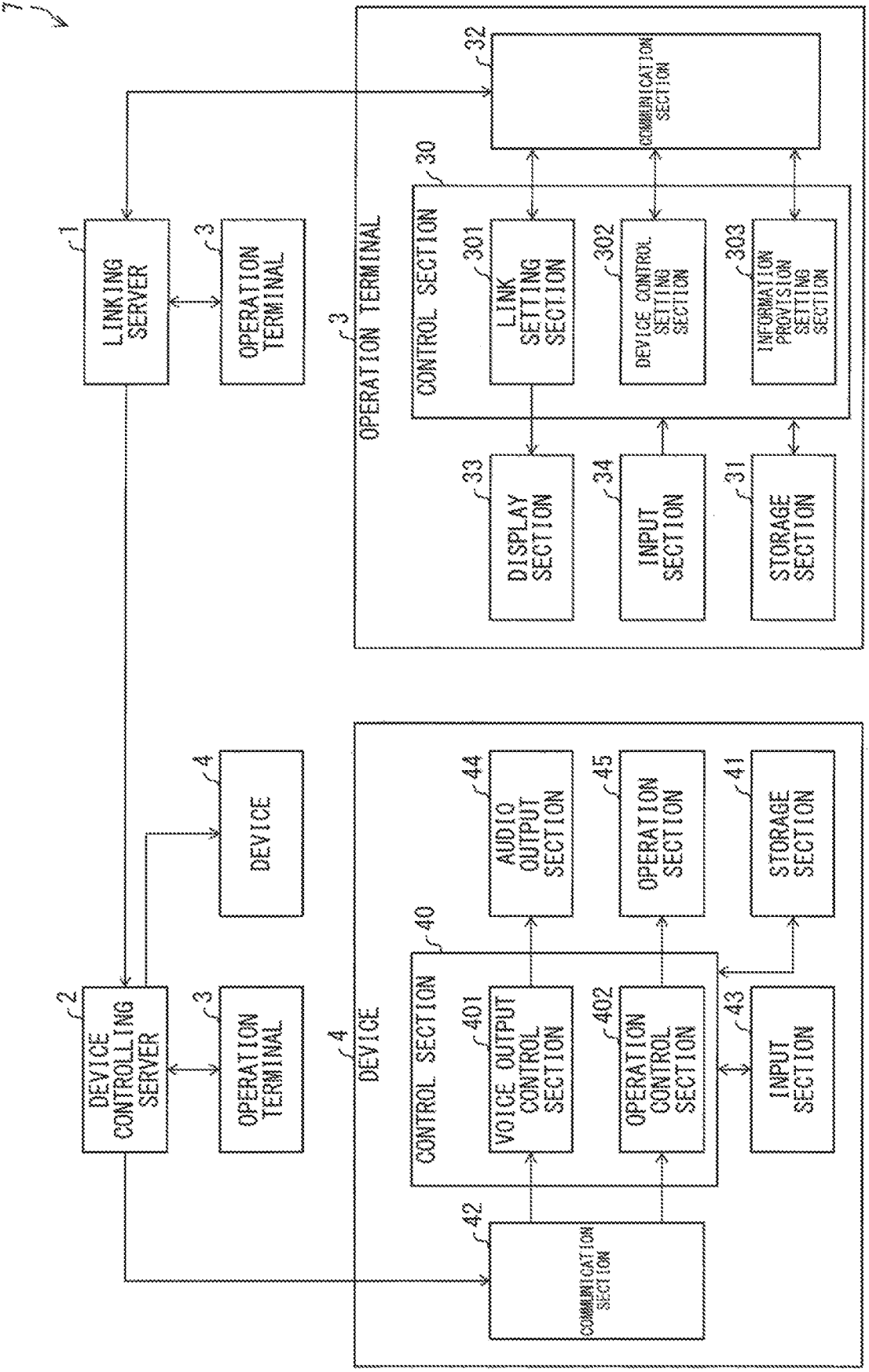
FIG. 2 is a block diagram illustrating an example configuration of main parts of an operation terminal and a device in accordance with Embodiment 1 of the present invention.

Next, with reference to FIG. 2, the following description will discuss respective configurations of the operation terminal 3 and the device 4. FIG. 2 is a block diagram illustrating an example configuration of main parts of the operation terminal 3 and the device 4. The operation terminal 3 will be discussed first, followed by the device 4.

[Configuration of Operation Terminal]

As illustrated, the operation terminal 3 includes (i) a control section 30 for comprehensively controlling each section of the operation terminal 3, (ii) a storage section 31 for storing various data used by the operation terminal 3, (iii) a communication section 32 for allowing the operation terminal 3 to communicate with other devices, (iv) a display section 33 for displaying an image in accordance with control by the control section 30, and (v) an input section 34 for accepting an input operation from the user.

The control section 30 includes a link setting section (device information display section) 301, a device control setting section. 302, and an information provision setting section 303. These processing sections can be realized by, for example, installing application software on the operation terminal 3.

The link setting section 301 carries out processing relating to the linking service. Specifically, the link setting section 301 accesses the linking server 1 and carries out, for example, processing to cause the linking server 1 to set a linking rule. The linking rule will be discussed later in detail.

The device control setting section 302 carries out processing relating to the device controlling service. Specifically, the device control setting section 302 accesses the device controlling server 2 and carries out processing for registering the user and the device 4 with the device controlling service.

The information provision setting section 303 carries out processing relating to an information providing service. Specifically, the information provision setting section 303 accesses the information providing server 5 and carries out, for example, (i) processing for registering the user with the information providing service and (ii) settings regarding information to be received from the information providing service.

[Configuration of Device]

As illustrated, the device 4 includes (i) a control section 40 for comprehensively controlling each section of the device 4, (ii) a storage section 41 for storing various data used by the device 4, and (iii) a communication section 42 for allowing the device 4 to communicate with other devices. The device 4 includes (i) an input section 43 for accepting an input operation from the user, (ii) an audio output section 44 for outputting audio in accordance with control by the control section 40, and (iii) an operating section 45 for carrying out a predetermined operation in accordance with control by the control section 40. For example, in a case where the device 4 is a self-propelled robotic vacuum cleaner, the operating section 45 is a section which performs vacuuming (movement of the device 4 and sucking up of dirt, etc.).

The control section 40 includes a voice output control section (operation execution section) 401 and an operation control section 402. The voice output control section 401 causes the audio output section 44 to output audio. For example, the voice output control section 401 follows an instruction from the device controlling server 2 so as to cause the audio output section 44 to output audio (output voice) in accordance with a linking rule. The operation control section 402 controls an operation of the operating section 45. Note that the action set in the linking rule may be an action of causing the device 4 to carry out an operation other than voice output. In such a case, the operation control section 402 functions as an operation execution section and causes the operating section 45 to carry out an operation in accordance with the linking rule.

[Example of Operation Screen for Setting Trigger]

Figure 8:
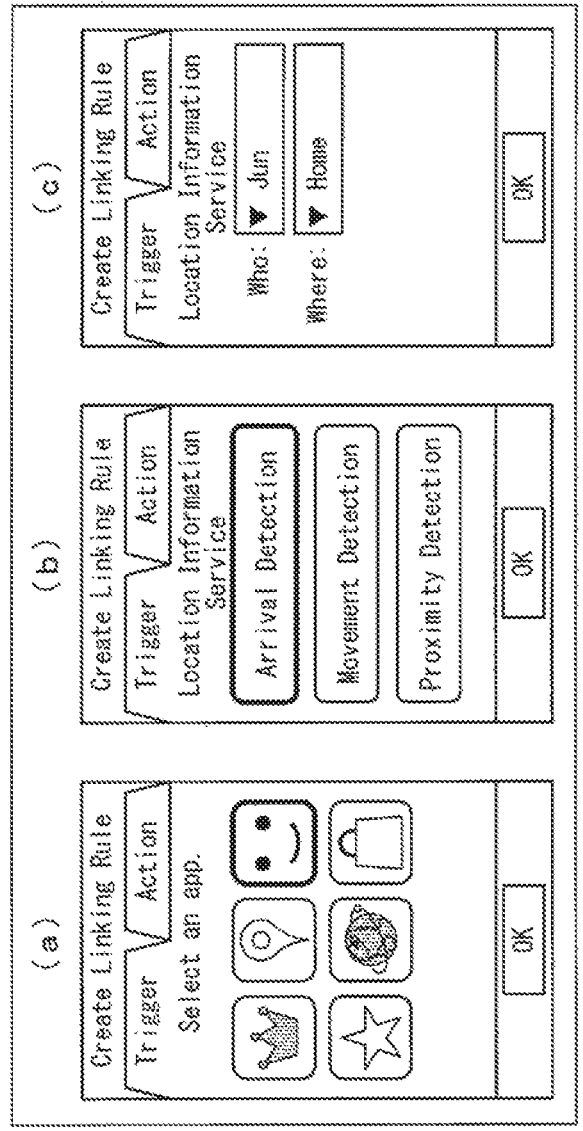
FIG. 8 is a diagram illustrating an example of an operation screen for setting a trigger service.

Next, with reference to FIG. 8, the following description will discuss an operation screen displayed by the operation terminal 3 for allowing the user to set a trigger. FIG. 8 is a diagram illustrating an example of an operation screen for setting the trigger service.

The examples of (a) through (c) of FIG. 8 illustrate operation screens in which switching tabs makes it possible to set a trigger service and an action service. In other words, selecting the "Trigger" tab allows the user to set the trigger, and selecting the "Action" tab allows the user to set the action. The link setting section 301 of the operation terminal 3 displays such an operation screen on the display section 33 when generation of a linking rule commences. Note that the link setting section 301 may receive and display an operation screen generated by the linking server 1 (more specifically, by the trigger setting section 101 and the action setting section 103). The link setting section 301 may alternatively display an operation screen after receiving, from the linking server 1, information necessary for displaying the operation screen.

In a case where the "Trigger" tab has been selected, the link setting section 301 may display icons for apps corresponding to trigger services, as illustrated in (a) of FIG. 8. Once the trigger service this example, an app) has been selected, the link setting section 301 carries out user authentication (not shown in FIG. 8) for the selected service. Successful user authentication makes it possible for the linking server 1 to obtain, from the selected service, user information (in this example, location information) relating to the authenticated user.

In a case where a location information service is selected from the screen illustrated in (a) of FIG. 8, the link setting section 301 then displays an operation screen for allowing the user to select a type of service, as illustrated in (b) of FIG. 8. In the example illustrated, displayed as selectable options are three types of services, specifically, (i) "arrival detection," which provides notification that a user has arrived at a predetermined location, (ii) "movement detection," which provides notification that a user has moved from a predetermined location, and (iii) "proximity detection," which provides notification that a user has entered a predetermined range around a predetermined location.

In a case where, out of these services, the arrival detection is selected, the link setting section 301 then displays on the display section 33 an operation screen for allowing the user to select what sort of information provided by the service will be used as the trigger condition, as illustrated in (c) of FIG. 8. In the example illustrated, the link setting section 301 displays an operation screen for allowing the user to designate an arriver and a place of arrival. In the example illustrated, the trigger condition is set to be a user having the user name "Jun" arriving at home (being located at home). In other words, in the illustrated example, the trigger condition is set to be transmission, from the location information service to the linking server 1, of information indicating that "Jun" has arrived at "home." Note that it is possible for names locations of arrival such as "home" to be displayed on the operation terminal 3 by causing, in advance, the linking server 1 to store names corresponding to location information which the location information service can provide.

[Example of Operation Screen for Setting Action]

Figure 9:
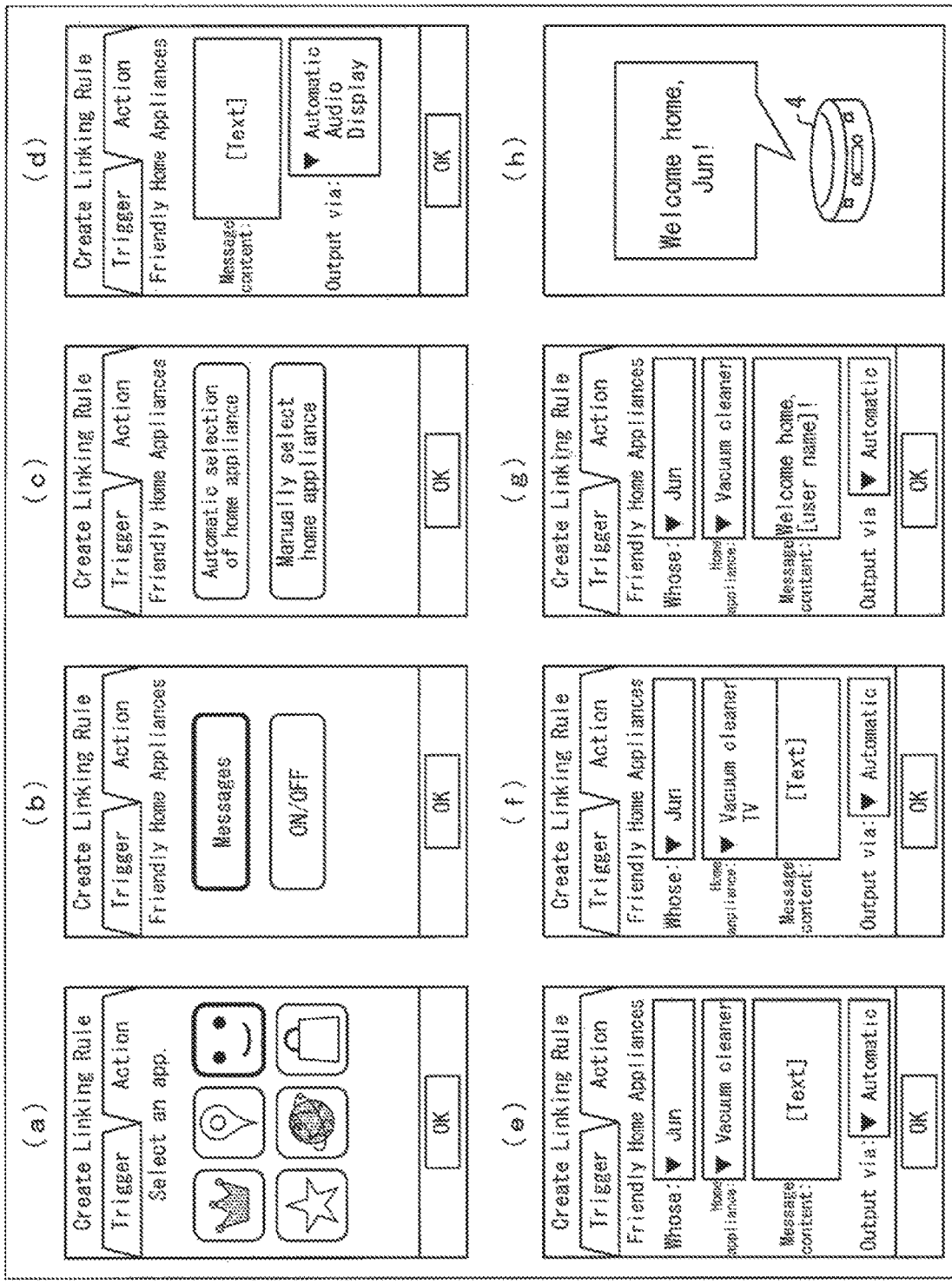
FIG. 9 is a diagram illustrating an example of an operation screen for setting an action service.

Next, with reference to FIG. 9, the following description will discuss an operation screen displayed by the operation terminal 3 for allowing the user to set an action. FIG. 9 is a diagram illustrating an example of an operation screen for setting an action service.

The operation screen of (a) of FIG. 9 is similar to that of (a) of FIG. 8. However, in (a) of FIG. 9, the action tab has been selected, and icons for apps corresponding to action services are displayed. Once the action service has been selected, the link setting section 301 carries out user authentication (not shown in FIG. 9) for the selected service. Successful user authentication makes it possible for the linking server 1 to (i) obtain, from the device controlling server 2, a device list which corresponds with the user and (ii) cause the selected service to carry out an action.

In a case where an app that is a service for causing the device 4 to output voice audio (a device controlling service is selected from the screen illustrated in (a) of FIG. 9, the link setting section 301 then displays an operation screen for allowing the user to select a type of service, as illustrated in (b) of FIG. 9. In the example illustrated, the link setting section 301 displays, as selectable options, (i) a message service for causing the device 4 to output a message and (ii) an ON/OFF service for switching the power of the device 4 on or off.

In a case where the message service is selected, the link setting section 301 then displays options for the user to select whether the home appliance (device 4) to output the message is to be selected automatically or manually, as illustrated in (c) of FIG. 9.

In a case where the user selects the option for automatic selection from the screen illustrated in (c) of FIG. 9, the link setting section 301 then displays an operation screen which allows the user to carry out detailed settings for message output. This operation screen may be one such as that of (d) of FIG. 9. In this example, the operation screen displays (i) a text box in which content of the message ("Message content:") is to be inputted and (ii) a drop down list for allowing the user a manner of output ("Output via:").

Three options are displayed for the manner of outputting the message: automatic, audio, and display. "Audio" corresponds to audio output of the message, while "display" corresponds to audio output of the message. "Automatic" corresponds to output of the message in a manner according to the function (action-compatible function) of the device 4 which will output the message. For example, as shown in FIG. 7, the action-compatible function of the air conditioner having the device ID T2125 is "voice output function." As such, in a case where (i) the air conditioner is selected as the device to carry out the action and (ii) the manner of message output is "automatic," the message will be outputted as voice (audio output). Note that in a case where (i) a device capable of both audio output and display output (such as the air conditioner having the device ID T2126 in FIG. 7) selected as the device 4 to carry out the action and (ii) the manner of message output is "automatic," the device 4 is caused to output the message via one of or both of audio output and display output.

Input necessary for setting the action is complete once the content of the message and the manner of message output are selected. In a case where (i) the "OK" key is pressed in this state and (ii) input necessary for setting the trigger has also been completed, the link setting section 301 notifies the linking server 1 of the settings for the trigger and the action. In this way, it is possible to establish the linking rule. Note that in a case where the necessary input has not been carried out, the link setting section 301 displays an error screen and prompts the user to carry out the necessary input.

In this example, the device 4 to carry out the action is not designated. As such, the device controlling server 2 selects a device to carry out the action. Furthermore a target user of the action is not designated. As such, the target user is also selected automatically. For example, the link setting section 301 may select, as the target user, a user who was successfully authenticated for the device controlling service at the time of the setting of the action.

In a case where the user selects the option for manual selection from the screen illustrated in (c) of FIG. 9, the link setting section 301 then displays an operation screen which allows the user to carry out detailed settings for message output, including selection of the device 4 to carry out the action. This operation screen may be one such as that of (e) of FIG. 9. In this example, the operation screen displays, in addition to the input fields displayed in (d) of FIG. 9, input fields for (i) a member ("Whose:") of the group (in this example, "Family") for which the message will be outputted, and (ii) the device 4 ("Home appliance:") to output the message.

In the input field for "Whose:", a drop down list displays (i) the user who was successfully authenticated for the device controlling service and (ii) members belonging to the same group as the successfully authenticated user. In the example illustrated, only "Jun" is being displayed, but other members (in the examples of FIGS. 5 and 6, "Dad" and "Mom") can be displayed in a drop down list and can be selected.

Once a member is selected in the input field for "Whose:", out of the devices 4 which the device controlling service can control, devices 4 corresponding to the selected member are displayed as possible options for outputting the message. In the example illustrated, as shown in (e) through (g) of FIG. 9, displayed in a drop down list are a vacuum cleaner and a TV, which are devices 4 capable of outputting voice for the selected member "Jun." The vacuum cleaner (robotic vacuum cleaner) has been selected.

Displayed in the drop down list as illustrated are device type names ("vacuum cleaner" and "TV") of the devices 4. However, in a case where a device list includes a plurality of devices 4 of the same device type, it may be difficult for the user to select a desired one of the devices 4 if the devices 4 are displayed by device type name. As such, it is preferable to employ a configuration in which (i) the user can set a registered name for each device 4 (for example, nicknames of the devices 4) in advance and (ii) the registered names are displayed in the drop down list. For example, in a case where a plurality of TVs are included in the device list, instead of simply displaying "TV," displaying registered names such as "Living room TV" makes it possible for the user to distinguish between the TVs by registered name and select a desired TV. The registered names may be inputted by the user from the operation terminal 3 after accessing the device controlling server 2. In an alternative configuration, options for registered names can be registered in advance by the device controlling server 2, and the user can select a registered name from the options via the operation terminal 3. The registered names can be included in the device management information 213. This makes it possible for the linking server 1 to obtain, from the device controlling server 2, a device list which includes the registered names.

As illustrated in (g) of FIG. 9, "Welcome home, [user name]" has been inputted as the content of the voice output. The content of the action can be finalized by pressing the "OK" key. This makes it possible to cause the device 4 which is a robotic vacuum cleaner to output the message "Welcome home, Jun!" as voice audio for "Jun" when Jun arrives at home.

[Flow of Processing for Generating Linking Rule]

Figure 10:
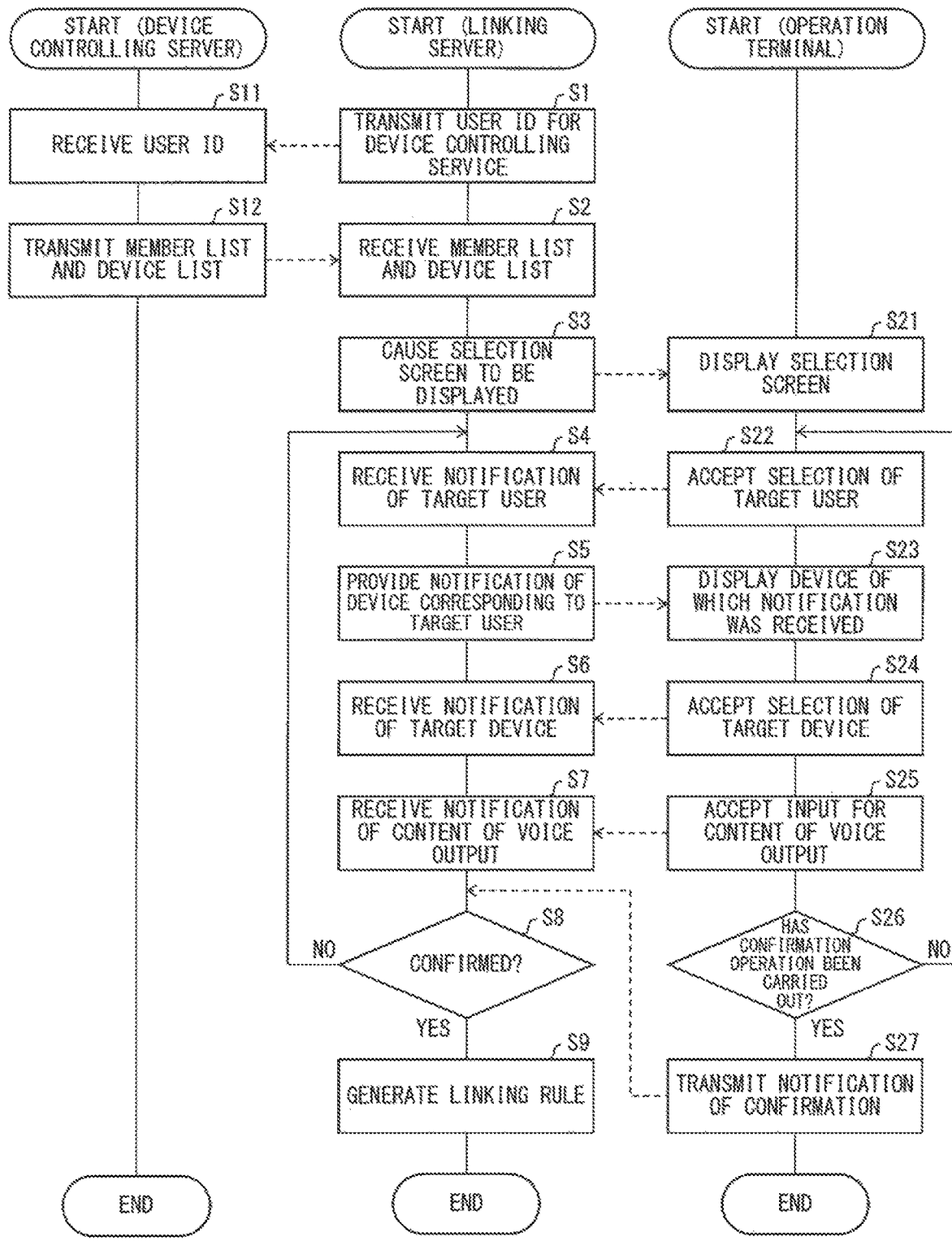
FIG. 10 is a flowchart showing an example of processing for generating a linking rule.

Next, with reference to FIG. 10, the following description will discuss a flow of processing for generating the linking rule. FIG. 10 is a flowchart showing an example of processing for generating a linking rule. Note that FIG. 10 shows processing carried out in a case where, after trigger conditions have been set, the option "Manually select home appliance" has been selected from the operation screen of (c) of FIG. 9.

Once the option "Manually select home appliance" has been selected, the action setting section 103 of the linking server 1 transmits, to the device controlling server 2, a user ID for the device controlling service and requests the device controlling server 2 to transmit a member list and device list each corresponding to the user having the user ID (S1).

Once the authentication section 202 of the device controlling server 2 receives the user ID (S11, information receiving step), the authentication section 202 refers to the group management information 212 and identifies (i) a group to which the user having the received user ID belongs and (ii) members of the group. The authentication section 202 then refers to the user management information 211 and generates a member list including user IDs and user names of each of the members identified thusly.

The authentication section 202 also refers to the device management information 213, identifies devices 4 for which the user having the user ID received in step S11 is a permitted user, and generates a device list including device IDs and registered names of the devices 4 thus identified. The authentication section 202 then sends, to the information transmitting section 203, the member list and the device list thus generated. Thereafter, the information transmitting section 203 transmits, to the linking server 1, the member list and the device list (S12, information transmitting step). At this point, processing carried out by the device controlling server 2 for setting the linking rule (i.e., the method of control by the device controlling server 2) ends.

Once the action setting section 103 of the linking server 1 receives the member list and the device list (S2), the action setting section 103 generates an operation screen (selection screen) which allows the user to select (i) a user name of a user included in the member list and (ii) a registered name included in the device list. The action setting section 103 causes the operation terminal 3 to display the operation screen (S3). From this operation screen, the user can select a target user for whom the action will be carried out, as illustrated in (e) of FIG. 9. The target user is selected from the user and members of the user's family (members belonging to the same group as the user).

The link setting section 301 of the operation terminal 3 displays the operation screen (selection screen) on the display section 33 (S21). Once the input section 34 accepts an operation for selecting the target user (S22), the link setting section 301 notifies the linking server 1 of the target user thus selected.

Once the action setting section 103 of the linking server 1 receives notification of the target user (S4), the action setting section 103 refers to the device list received in step S2, identifies devices 4 corresponding to the target user, and notifies the operation terminal 3 of the devices 4 thus identified (S5). Note that a device 4 corresponding to the target user is (i) a device 4, included in the device list received in step S2, which the target user can set to be controlled or (ii) a device 4, included on the device list received in step S2, which can carry out an operation (for example, voice output) for the target user.

The link setting section 301 of the operation terminal 3 displays registered names of the devices 4 indicated in the notification (S23). The registered names can be displayed in a drop down list as in the example of (f) of FIG. 9. Then, once the input section 34 accepts an operation for selecting a registered name out of those displayed, the link setting section 301 determines that the device 4 having the registered name has been selected as a target device, which is the device 4 to be controlled so as to carry out the action. The link setting section 301 then notifies the linking server 1 of the target device. This notification can be done by using the device ID or the registered name.

The link setting section 301 accepts input for the content of the voice output (S24). For example, the link setting section 301 can accept input for the content of the voice output by allowing the content of the voice output to be inputted into a text box, as in the example of (g) of FIG. 9. The link setting section 301 then notifies the linking server 1 of the content of the voice output thus accepted. Note that link setting section 301 may also accept input regarding the manner of output for the message, as in the examples of (e) to (g) of FIG. 9.

Furthermore, after having accepted all input necessary for setting the linking rule, the link setting section 301 determines whether a confirmation operation has been carried out by the user (S26). For example, in the example of FIG. 9, the link setting section 301 may determine that a confirmation operation has been carried out in a case where the "OK" key has been selected. In a case where the link setting section 301 determines that a confirmation operation has not been carried out ("NO" in S26), the link setting section 301 returns to the processing of step S22. In a case where the link setting section 301 determines that a confirmation operation has been carried out ("YES" in S26), the link setting section 301 transmits notification of the confirmation to the linking server 1, and the processing for setting the linking rule ends.

After the action setting section 103 of the linking server 1 receives notification of the target device (S6) and receives notification of the content of the voice output (S7), the action setting section 103 determines whether or not it has received notification of confirmation (S8). In a case where the action setting section 103 determines that it has not received notification of confirmation ("NO" in S8), the action setting section 103 returns to the processing of step S4. In a case where the action setting section 103 determines that it has received notification of confirmation ("YES" in S8), the action setting section 103 transmits, to the rule generating section 105, notification of the target user, the target device, and the details of the voice output which have been confirmed.

The rule generating section 105 generates a linking rule (S9) in which the following are associated with each other: the target user, the target device, the details of the voice output, and the trigger condition set by the trigger setting section 101 via processing not illustrated. The rule generating section 105 then stores the linking rule in the storage section 11, and the processing for setting the linking rule ends.

In a case where "Automatic selection of home appliance" is selected from the operation screen of (c) of FIG. 9, the link setting section 301 of the operation terminal 3 displays an operation screen such as that of (d) of FIG. 9 and accepts necessary input. Once a confirmation operation has been carried out, the link setting section 301 notifies the linking server 1 of (i) the content of the accepted input and (ii) the user ID of the target user (for example, the user who was successfully authenticated for the device controlling service at the time of setting the action). The link setting section 301 then ends its processing. In such a case, the rule generating section 105 of the linking server 1 generates a linking rule which does not include a designation for the device 4 (but which does include the user ID of the target user).

[Flow of Processing in Accordance with Generated Linking Rule]

Figure 11:
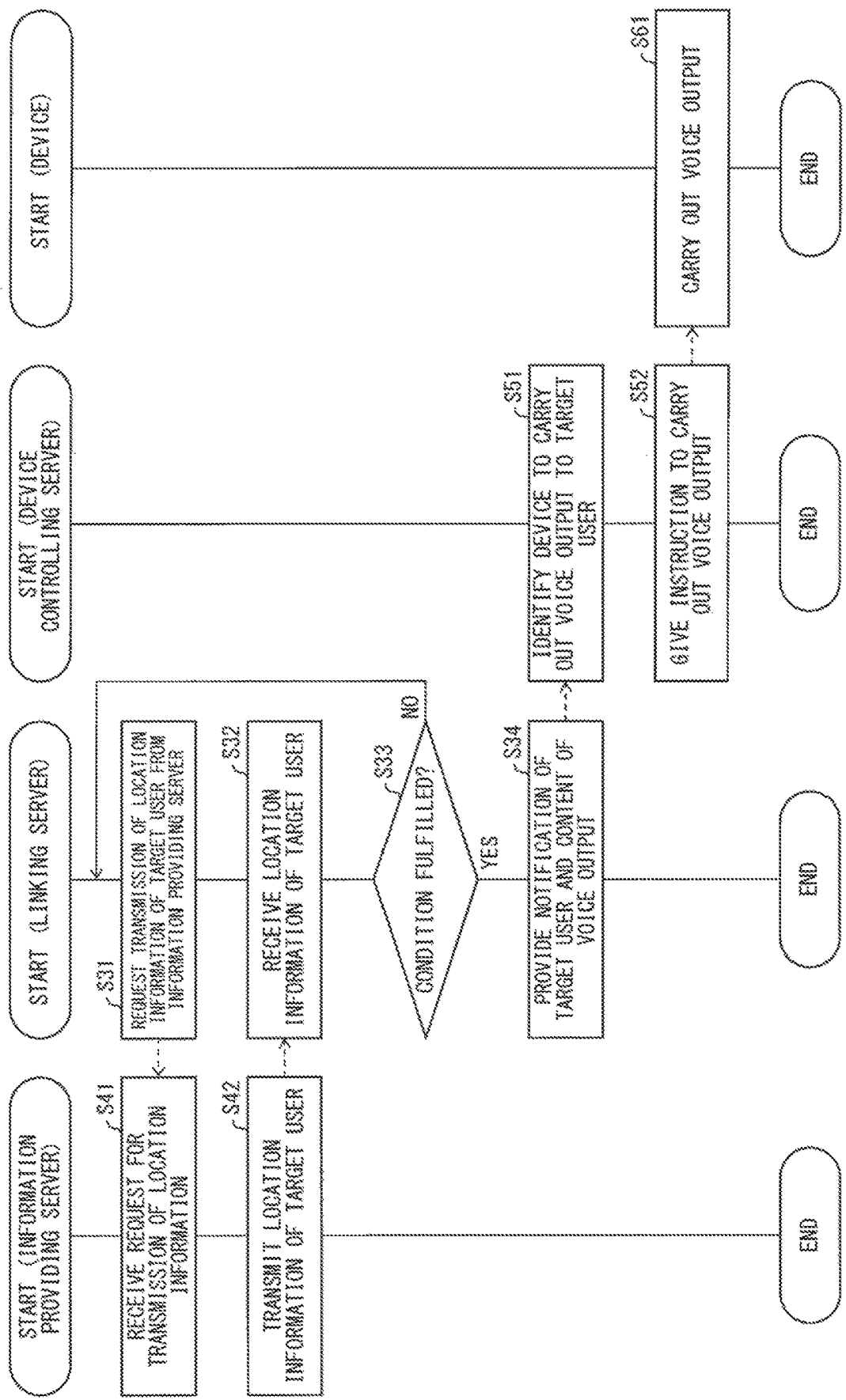
FIG. 11 is a flowchart showing an example of processing carried out in accordance with a linking rule.

Next, with reference to FIG. 11, the following description will discuss a flow of processing carried out in accordance with a linking rule that has been generated. FIG. 11 is a flowchart showing an example of processing carried out in accordance with a linking rule that has been generated. In accordance with the linking rule 111 stored in the storage section 11, the condition determining section 106 of the linking server 1 requests the information providing server 5 to transmit location information of the target user (S31). Once the information providing server 5 receives this request (S41), the information providing server 5 accordingly transmits, to the linking server 1, the location information of the target user (S42).

Once the condition determining section 106 of the linking server 1 receives the location information from the information providing server 5 (S32), the condition determining section 106 determines whether or not the trigger condition has been fulfilled (S33). Specifically, in a case where the location information set as the trigger condition in the linking rule 111 matches the location information received in step S32, the condition determining section 106 determines that the condition has been fulfilled. In a case where the location information set as the trigger condition in the linking rule 111 does not match the location information received in step S32 do not match, the condition determining section 106 determines that the condition has not been fulfilled. In a case where the condition determining section 106 determines that the condition has not been fulfilled ("NO" in S33), the condition determining section 106 returns to the processing of step S31. In the case of a "NO" determination in step S33, the condition determining section 106 carries out the processing of step S31 after a predetermined stand-by period (for example, 15 minutes) has passed.

In a case where the condition determining section 106 determines in step S33 that the condition has been fulfilled ("YES" in S33), the condition determining section 106 notifies the action controlling section 107 of the details of the action of the linking rule 111 whose condition was satisfied. Specifically, the condition determining section 106 notifies the action controlling section 107 of the target user and the content of the voice output (message for the device 4 to output) which are designated in the linking rule 111. In a case where a target device is designated in the linking rule, the condition determining section 106 also notifies the action controlling section 107 of the target device. Note that in a case where the content of the voice output is to include a user name, as in the example of (g) of FIG. 9, the condition determining section 106 can finalize the content of the voice output by utilizing, as the user name in the content of the voice output, a user name included in the return value (location information received in step S32) from the location information transmission request of step S31.

The action controlling section 107 then notifies the device controlling server 2 of the target user and the content of the voice output (S34). In a case where the notification does not include a target device, the device controlling section 204 of the device controlling server 2 notifies the device identifying section 205 of the target user and the details of control (message output) and instructs the device identifying section 205 to identify a device 4 corresponding to the target user and the details of the control. Upon receiving such instructions, the device identifying section 205 identifies a target device by referring to the device management information 213 and identifying, out of the devices 4 for which the target user is a permitted user, a device 4 capable of outputting a message (S51). The device identifying section 205 then notifies the device controlling section 204 of the target device thus identified, and the device controlling section 204 instructs the target device to output the content of the voice output indicated in the notification from the linking server 1 (S52). Note that in a case where the linking server 1 provides notification of the target device (in a case where the device 4 has been manually selected), the processing of step S51 is skipped, and processing proceeds to step S52. Through this process, the target device is caused to output the content of the voice output (S61). Note that in a case where the target device identified in step S51 is a device 4 having a display function, the target device may output the message as audio in step S61.

[Flow of Processing in Accordance with Generated Linking Rule (Using API)]

Figure 12:
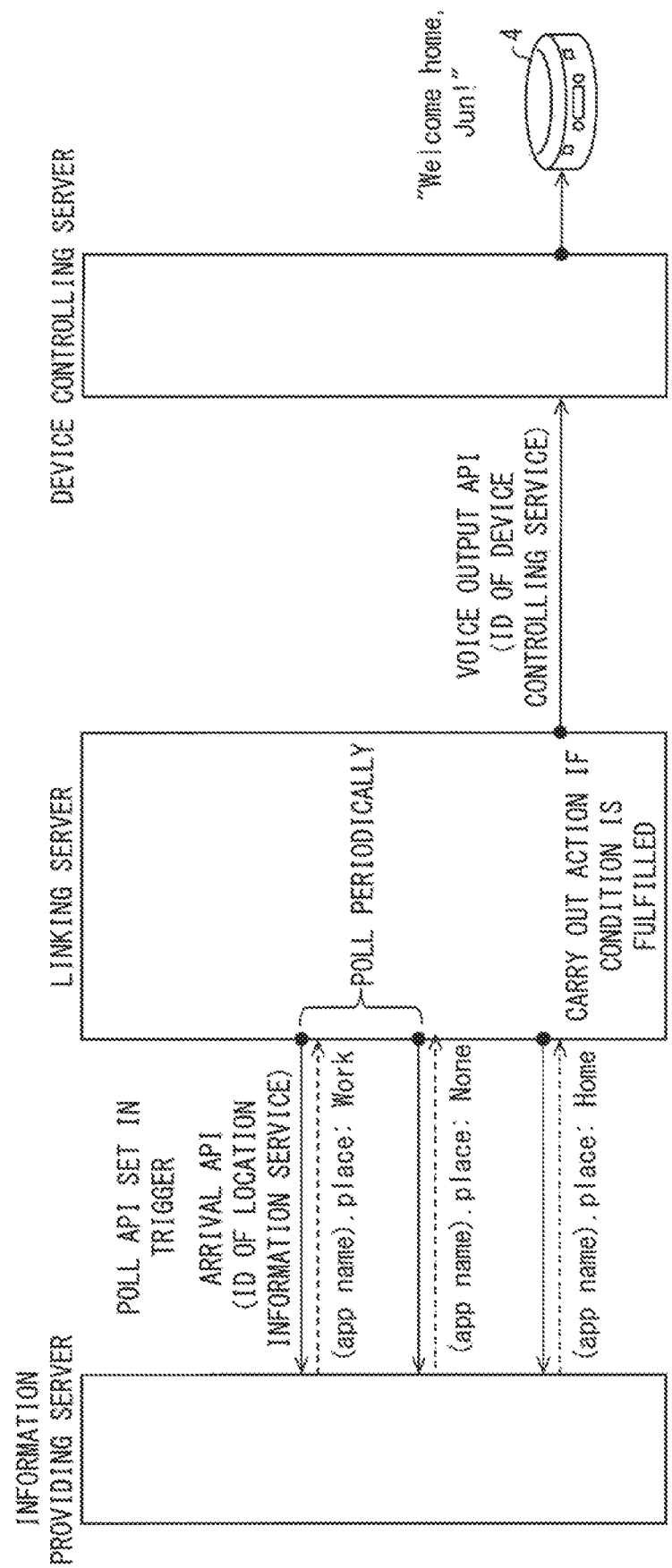
FIG. 12 is a sequence diagram illustrating an example of processing carried out in accordance with a linking rule that has been generated, the processing being realized by use of an API.

The above processing carried out in accordance with a linking rule that has been generated can be realized by use of an application programming interface (API). The following description will discuss this with reference to FIG. 12. FIG. 12 is a sequence diagram illustrating an example of processing carried out in accordance with a linking rule that has been generated, the processing being realized by use of an API.

The condition determining section 106 of the linking server 1 periodically polls an API set in a trigger. That is, the condition determining section 106 periodically polls an arrival API (an API which provides information indicating a location at which a designated user has arrived) of the information providing server 5. In doing so, the condition determining section 106 transmits, to the information providing server 5, a user ID for the location information service. The information providing server 5 then returns, to the linking server 1, information indicating a location (current location) at which the user having the received user ID has arrived. The information sent at this time can be, for example, in a format such as "(app name).place: (place name)", as in the example illustrated. Note that (app name) is the name of the app that is the location information service. (Place name) is information which is provided in a notification in a case where the user is at a preset place such as the user's workplace or home. In a case where the user is not at the preset place, a notification provides information indicating such (in the example illustrated, this information is shown as "nothing"). Note that user identification information (for example, a user name) can be transmitted along with the information indicating the location at which the user has arrived. In such a case, the identification information can be outputted to the device 4.

In a case where the "place name" in "(app name).place: (place name)," which is the return value of the polling, matches the place name which has been set in the linking rule, the condition determining section 106 of the linking server 1 determines that the trigger condition has been fulfilled. In a case where the condition determining section 106 has determined that the trigger condition has been fulfilled, the action controlling section 107 transmits, to a voice output API (an API for causing a designated device 4 to output designated content as voice audio), the user ID for the device controlling service. By doing so, the condition determining section 106 causes the device 4 to carry out an action which has been set in the linking rule whose trigger condition was fulfilled.

For example, FIG. 12 illustrates an example in which a linking rule has been set such that the device 4 will output "Welcome home, Jun!" as voice audio when the user having the user name "Jun" arrives at home. In such a case, when the "place name" in the return value of polling becomes "home," the device controlling server 2 controls the device 4, in accordance with control from the linking server 1, so that the device 4 outputs "Welcome home, Jun!" as voice audio. Note that the "Jun" portion of the voice output can be included in the content of the voice output in advance. Alternatively, in a case where the user name is included in the return value of the polling, the return value can be used to so that "Jun" is included in the voice output.

[Example of Linking Rule Generation by Group]

Figure 13:
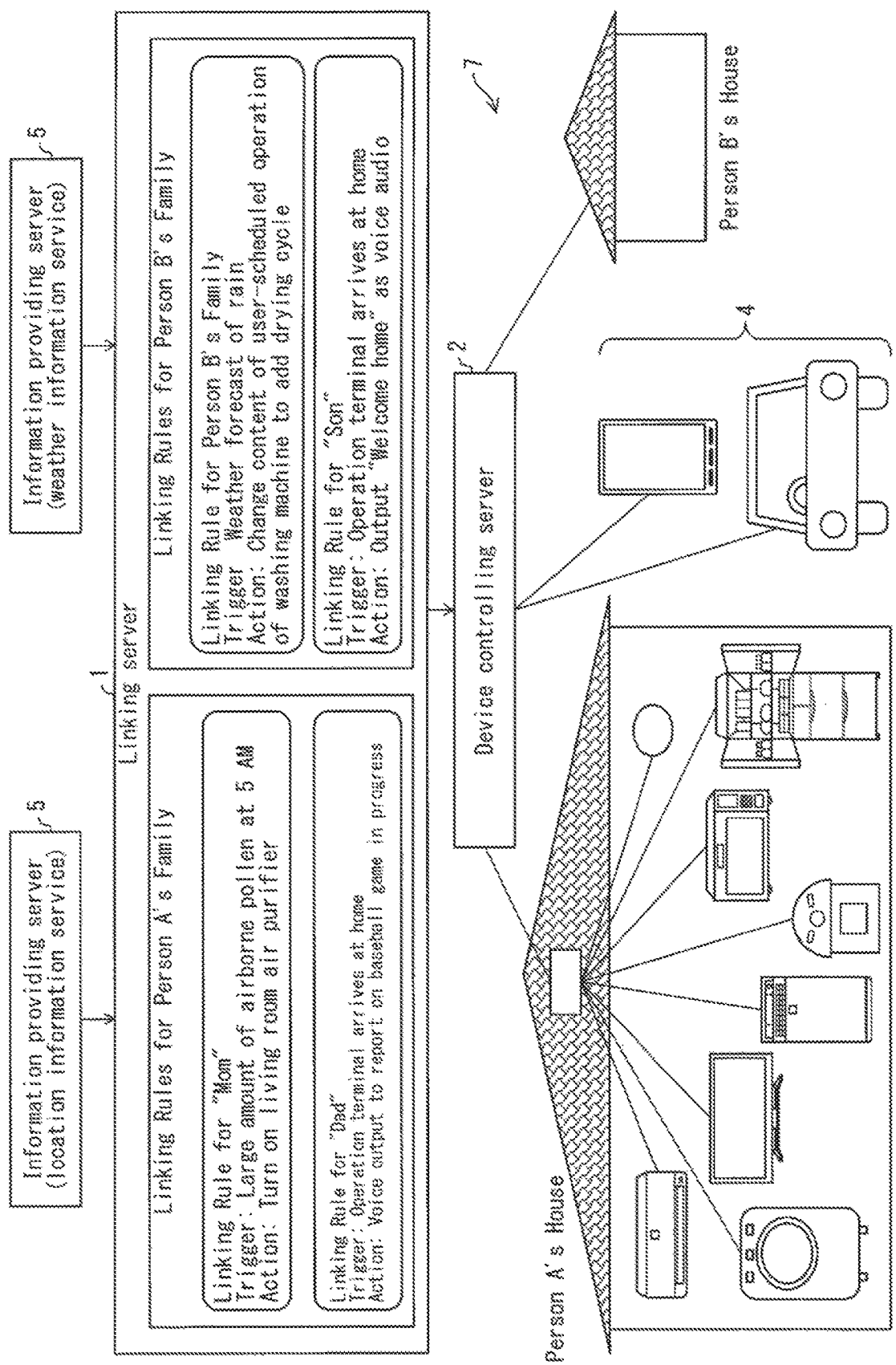
FIG. 13 is a diagram illustrating an example of linking rules generated so as to differ by group.

As described above, the linking system 7 makes it possible for a user to generate a linking rule for causing a device 4 to carry out an operation, the device 4 being related to a group to which the user belongs. The following description will discuss, with reference to FIG. 13, an example of linking rule generation by group. FIG. 13 is a diagram illustrating an example of linking rules generated so as to differ by group.

In the example illustrated, respective linking rules have been generated for two groups, which are Person A's family and Person B's family. Member of Person A's family can set a device 4 in Person A's home as a device to carry out an action. In the example illustrated, the devices 4 in Person A's home are an air conditioner, a washing machine, a TV, an air purifier, a robot that converses with a user, a microwave oven, a refrigerator, lighting, a smartphone, and an in-vehicle device (for example, a car navigation system). As such, members of Person A's family can select a device 4 out of these devices 4 to carry out an action. Note that the devices 4 are not limited to those in the example illustrated.

FIG. 13 illustrates an example in which the trigger services are the location information service and a weather information service that provides weather information. As such, members of Person A's family can generate a linking rule which uses any combination of one these services and a device 4 in Person A's home. Members of Person B's family can generate rules in a similar manner.

Specifically, in the example illustrated, in a linking rule for "Mom" of Person. A's family, the trigger is set as being the weather information provided by the weather information service indicating that there will be a large amount of in-air pollen at 5 AM. In the linking rule, out of the devices 4 in Person A's home, the air purifier in the living room is set to carry out the action, which is turning on.

In a linking rule for "Dad" of Person A's family, the trigger is set as being the location information service providing location information indicating that Dad's operation terminal 3 has arrived at home. In the linking rule, the action is set as being a device 4 in Person A's home providing, as voice output, a report on a baseball game in progress. The report on the baseball game in progress can be obtained from another information providing server. The device 4 to carry out the voice output can be, for example, device 4 which is the first of the devices 4 to detect "Dad." Other possible linking rules include, for example, a linking rule in which (i) the trigger is set as being the location information service providing notification that Dad's operation terminal 3 has arrived at the train station nearest to home and (ii) the action is set as being the air conditioner in the dining room of Person A's home turning on.

For Person B's family, a linking rule has been generated such that (i) the trigger is set as being the weather information service providing a forecast of rain and (ii) out of the devices 4 in Person B's home, the washing machine is set to carry out the action, which is changing content of a user-scheduled operation of the washing machine so that drying is carried out. In a linking rule for "Son" of Person B's family, the trigger is set as being the location information service providing location information indicating that Son's operation terminal 3 has arrived at home, and the action is set as being a device 4 in Person B's home outputting "Welcome home" as voice audio. This linking rule may be generated by "Son" or may be generated by another member of Person B's family.

In this way, the linking system 7 allows each member of each family to (i) select a desired device 4 out of the many devices 4 in the respective homes and (ii) generate a linking rule such that the selected device 4 carries out an action.

Embodiment 2

Figure 14:
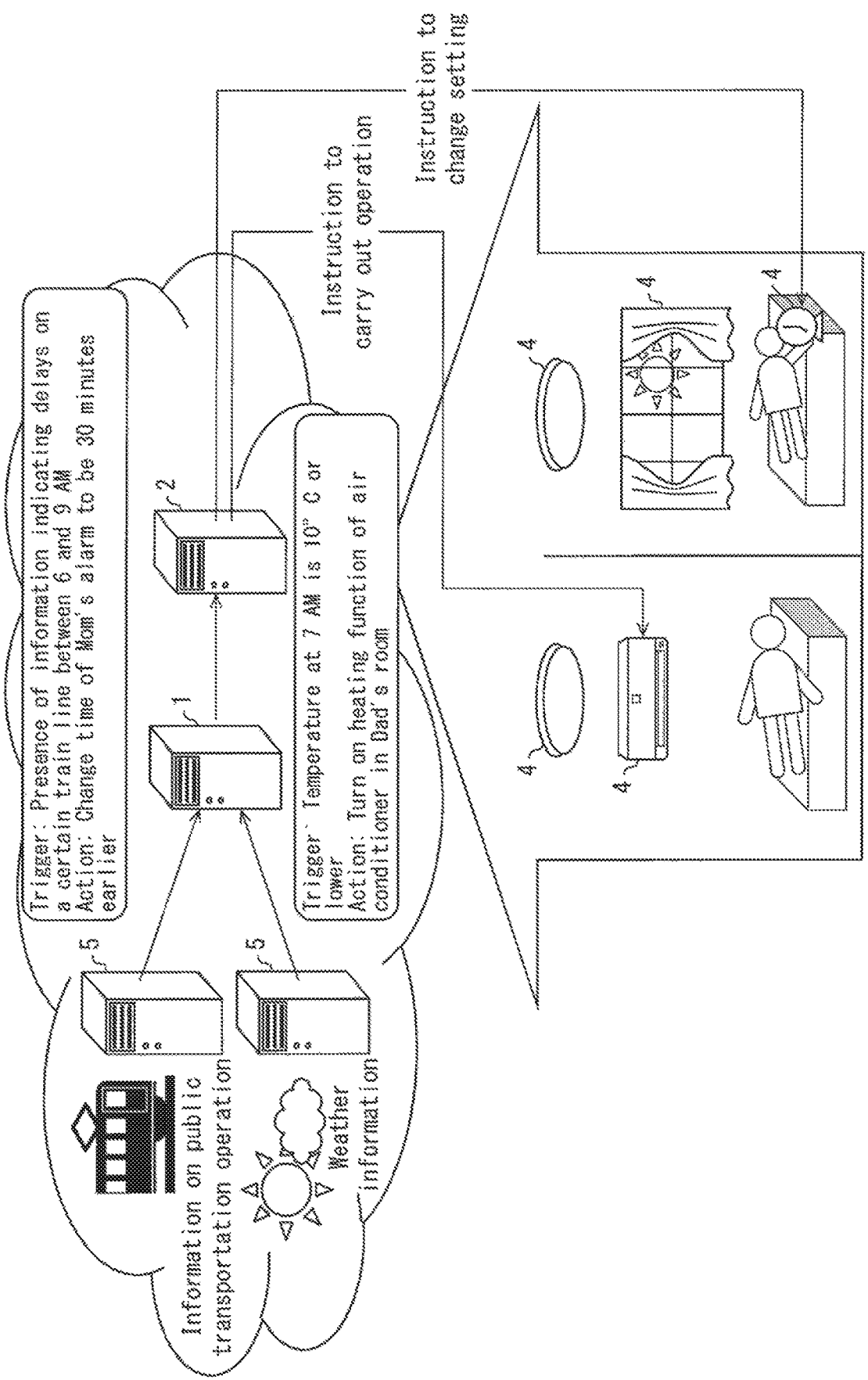
FIG. 14 is a diagram illustrating Embodiment 2 of the present invention and is a diagram illustrating an example of linking rules generated so as to differ by group member.

As described above, the linking system 7 makes it possible to generate linking rules that differ by group member. Discussed in Embodiment 2, with reference to FIG. 14, is another example in which linking rules are generated so as to differ by group member. FIG. 14 is a diagram illustrating an example of linking rules generated so as to differ by group member. This example assumes a case where services that can be set as the trigger services are (i) a transportation operation information service which provides information on public transportation operation and (ii) the weather information service. For convenience, members similar in function to those described in the foregoing embodiment will be given the same reference signs, and their description will be omitted. The same applies to all other embodiments after Embodiment 2 as well.

In the example illustrated, respective linking rules have been generated independently for "Dad" and "Mom," who belong to the same group. Specifically, a linking rule for "Mom" has been generated such that (i) the trigger set as being the presence of information indicating that trains on a certain railway line will be delayed between 6 AM and 9 AM and (ii) the action is set as being changing the time of a wake-up alarm for "Mom" to be 30 minutes earlier. This makes it possible, in a case where there are delays on a railway line used by "Mom" during her commute, for "Mom" to take measures such as leaving the house early or using a different train line. Furthermore, since the time of wake-up alarms is not changed for other members (for example, "Dad") who don't use that train line, the other members' sleep will not be disrupted.

For "Dad," a linking rule has been generated such that (i) the trigger is set as being the temperature at 7 AM being 10° C. or less and (ii) the action is set as being the heating function of an air conditioner in Dad's room being turned on. This allows "Dad" to wake up comfortably on cold mornings. Furthermore, this avoids wasteful use of energy, since air conditioners are not turned on in rooms of other members who do not need heating in the morning.

Embodiment 3

Figure 15:
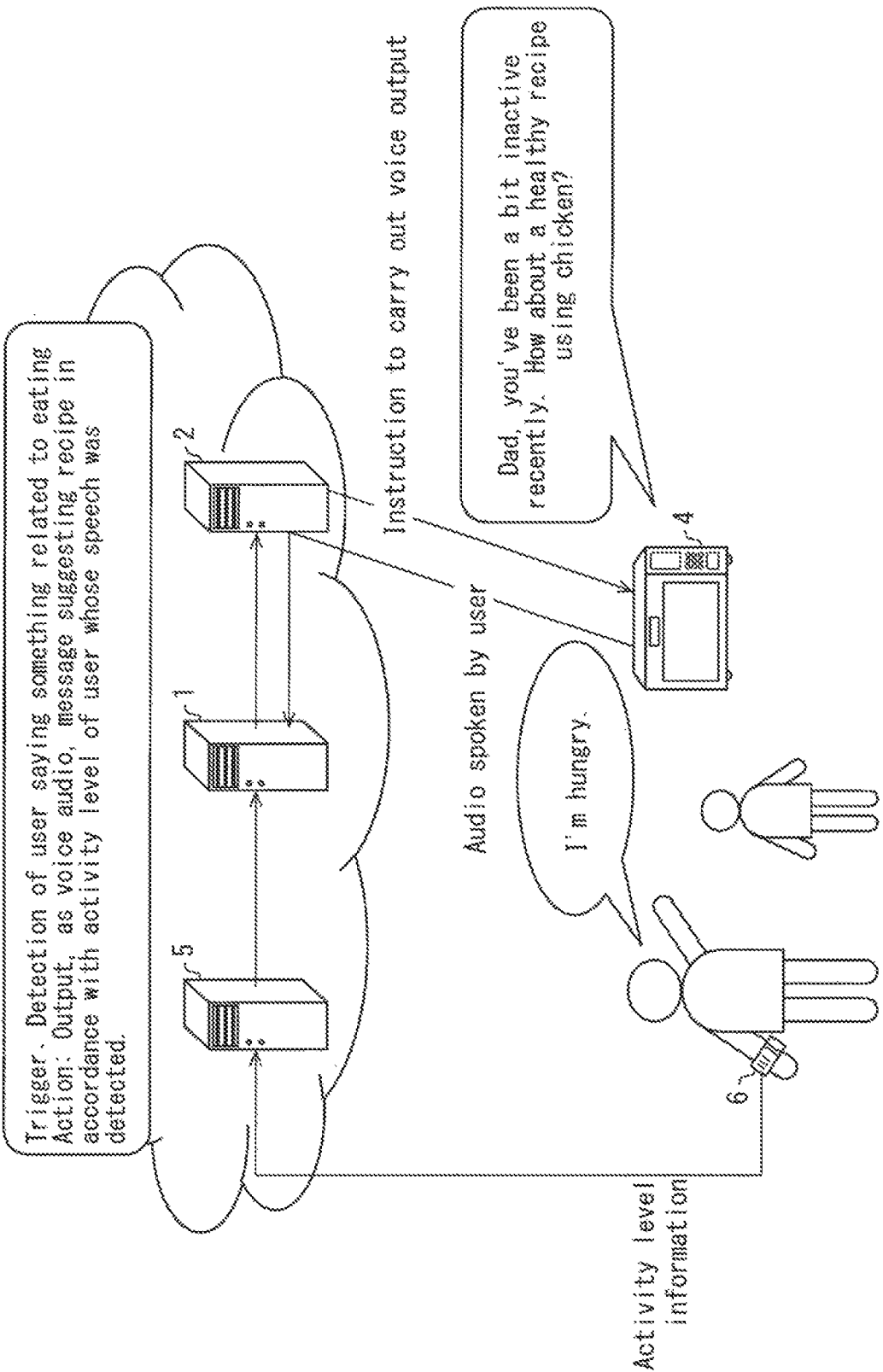
FIG. 15 is a diagram illustrating Embodiment 3 of the present invention and is a diagram illustrating an example of a linking rule in which a user speaking a predetermined phrase is set as a trigger.

Discussed in Embodiment 3, with reference to FIG. 15, is an example of a linking rule in which user speech is set as a trigger. FIG. 15 is a diagram illustrating an example of a linking rule in which a user speaking a predetermined phrase is set as a trigger. More specifically, in the linking rule as illustrated, the trigger is set as being detection of the user saying something related to eating, and the action is set as being a device 4 (a microwave oven, which is a home appliance for cooking) outputting a message as voice audio. Specifically, the device 4 outputs a message suggesting a recipe in accordance with an activity level of the user whose speech was detected.

In the present example, the device 4 includes an audio input section for acquiring audio spoken by a user and an audio transmitting section for transmitting the audio to a device controlling server 2. The device controlling server 2 includes (i) a speaker identifying section for analyzing the audio and identifying which one of the users of the device 4 was the user who spoke, (ii) a speech content identifying section for analyzing the audio and determining the content of speech (what the speech was related to) and (iii) an analysis result notification section for notifying the linking server 1 of the respective results of the identification. In other words, in addition to providing the device controlling service described in the other examples, the device controlling server 3 of the present example also provides a speech analyzing service for analyzing the content of a user's speech.

The speech analyzing service may be providing by another server. Furthermore, in each of the examples discussed later, differing services may be provided by respective differing servers, a plurality of differing services may be provided by a single server, or a single service may be provided by a plurality of servers.

Furthermore, in the present example, an information providing server 5 obtains activity level information about a user from a device 6 (specifically, an activity level meter) worn by the user. The information providing server 5 stores the activity level information in a database by user and provides each user with information relating to that user's activity level. In other words, the information providing server 5 of the present example provides an activity level information providing service.

As such, when the above linking rule is generated, the trigger service is set to be the speech analyzing service, and the action services are set to be the activity level information providing service and the device controlling service. In this way, the linking rule can be set so that the action involves a combination of a plurality of services.

The following description will discuss processing carried out in accordance with this linking rule. The device 4 acquires audio spoken by the user and transmits the audio to the device controlling server 2. The device controlling server 2 analyzes the audio thus received and identifies the user who spoke and the content of the speech. The device controlling server 2 then transmits, to the linking server 1, information indicating the user and the content of the speech thus identified. Then, in a case where the user and the content of the speech received by the linking server 1 match a user and content of speech which are set in the trigger condition of the linking rule, the linking server 1 determines that the action should be carried out, the action being the device 4 recommending a recipe to the user via voice output.

Next, after determining that the action should be carried out, the linking server 1 obtains activity level information of the user from the information providing server 5, transmits the activity level information to the device controlling server 2, and instructs the device controlling server 2 to cause the device 4 to recommend via voice output a recipe in accordance with the activity level information.

Then, after receiving the activity level information and the instructions to cause the device 4 to recommend the recipe via voice output, the device controlling server 2 selects, in accordance with the received activity level information, a recipe from among recipes stored in advance for the device 4. The device controlling server 2 then generates a message for recommending the recipe, sends the message to the device 4, and causes the device 4 to output the message via voice audio. This message can include, for example, the user name of the user who spoke (Dad) and a message in accordance with the user's activity level ("You've been a bit inactive recently"), as in the example illustrated.

The recipe to be recommended is preferably a recipe that can be cooked by the device 4. In a case where it is possible to cause the device 4 to carry out cooking of a recipe by downloading data for the recipe to the device 4, the device controlling server 2 preferably transmits the data for the recipe to the device 4, either automatically or in accordance with a user operation carried out on the device 4. This makes it possible, in a case where the user likes the recipe that was recommended, for the cooking of the recipe to be carried out smoothly. Of course, recipe downloading is not limited to downloading from the device controlling server 2. The recipe may be downloaded from another server (for example, a server which manages data for recipes for the device 4).

Embodiment 4

Figure 16:
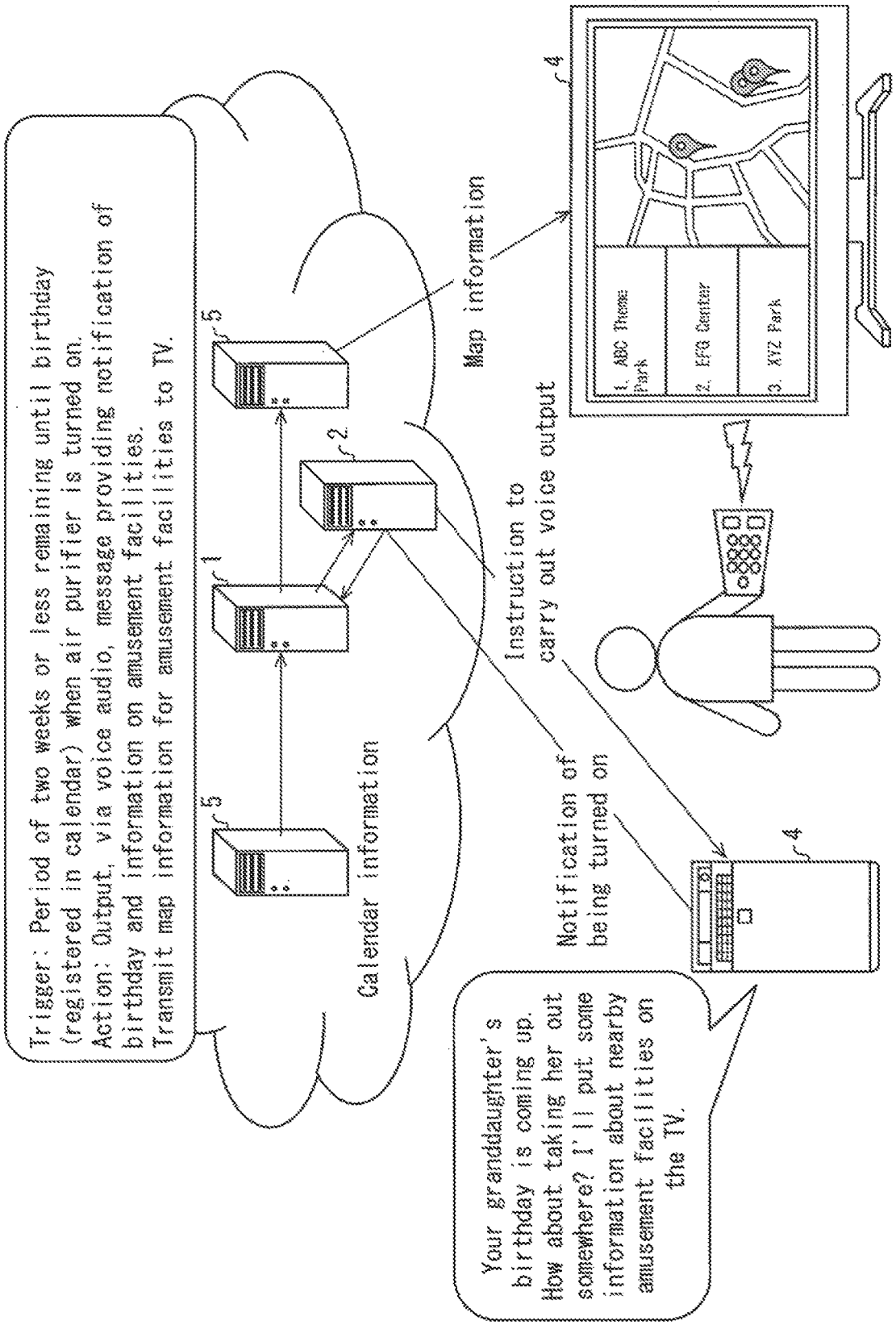
FIG. 16 is a diagram illustrating Embodiment 4 of the present invention and is a diagram illustrating an example of a linking rule for causing a plurality of devices to carry out an action.

Discussed in Embodiment 4, with reference to FIG. 16, is an example of a linking rule for causing a plurality of devices 4 to carry out an action. FIG. 16 is a diagram illustrating an example of a linking rule for causing a plurality of devices 4 to carry out an action. More specifically, in the linking rule as illustrated, the trigger is set as being a period of two weeks or less remaining until a birthday at the time an air purifier is turned on, the birthday being registered in a calendar. The actions are set as being (i) a device 4 outputting, via voice audio, a message which provides notification of the birthday and provides information on amusement facilities and (ii) transmission, to a TV, of map information for the amusement facilities.

In the present example, two devices 4 (the air purifier and the TV) are used. The air purifier has a function of notifying a device controlling server 2 when the air purifier is turned on. The TV has a function of downloading map information and facility information from an information providing server 5 and displaying the map information and facility information.

In addition to providing the device controlling service described in the other examples, the device controlling server 2 of the present example also provides a device information providing service for providing notification of an operational status of a device 4 (specifically, that the air purifier has been turned on). Furthermore, in the present example, two information providing servers 5 are used. One of the information providing servers provides a schedule managing service for managing a user's schedule, and the other one of the information providing servers 5 provides a map information service for providing notification of map information for a designated facility.

As such, when the above linking rule is generated, the trigger services are set to be the device information providing service and the schedule managing service, and the action services are set to be the device controlling service and the map information service.

The following description will discuss processing carried out in accordance with this linking rule. Once the device 4 which is the air purifier is turned on via a user operation, the device 4 notifies the device controlling server 2 of such. The device controlling server 2 then transmits, to the linking server 1, a user ID of the user of the device 4 and a notification indicating that the device 4 has been turned on.

After having received the notification, the linking server 1 transmits the user ID, received with the notification, to the information providing server 5 which provides the schedule managing service. The linking server 1 then obtains, from the information providing server 5, calendar information for the user having the user ID. The calendar information contains information indicating a birthday registered by the user. The birthday may be the user's birthday or another person's birthday. In this example, the birthday of the user's grandchild has been registered.

In a case where the linking server 1 determines that two weeks or less remain between the current date and the birthday indicated in the calendar information thus received, the linking server 1 determines that the trigger condition has been fulfilled and determines that the actions should be carried out.

Next, after determining that the actions should be carried out, the linking server 1 instructs the device controlling server 2 to cause the device 4 which is the air purifier to output, as voice audio, a message in accordance with the birthday indicated in the calendar information. The linking server 1 also instructs the information providing server 5 which provides the map information service to transmit, to the device 4 which is the TV, map information for amusement facilities. In a case where location information for the user's home can be obtained from, for example, the schedule managing service, transmitting the location information together with the map information makes it possible to transmit map information for amusement facilities which are near the user's home.

The above processing makes it possible to cause the device 4, which is the air purifier that has been turned on, to notify a user that the user's grandchild's birthday will be soon. The above processing also makes it possible to use the device 4 which is the TV to provide the user with map information for amusement facilities. The device 4 may immediately display the map information upon receiving it. However, the device 4 preferably first notifies the user that information has been received and then, in a case where the user carries out an operation to select displaying of the information, displays the map information. This makes it possible to prevent displaying the map information in a manner that would hinder the user's TV viewing.

In the above linking rule, the actions may be further combined with an action caused by an electronic commerce (EC) service. For example, the EC service may cause the TV to display a purchase screen for purchasing, for example, tickets to an amusement facility for which information has been provided.

Embodiment 5

Figure 17:
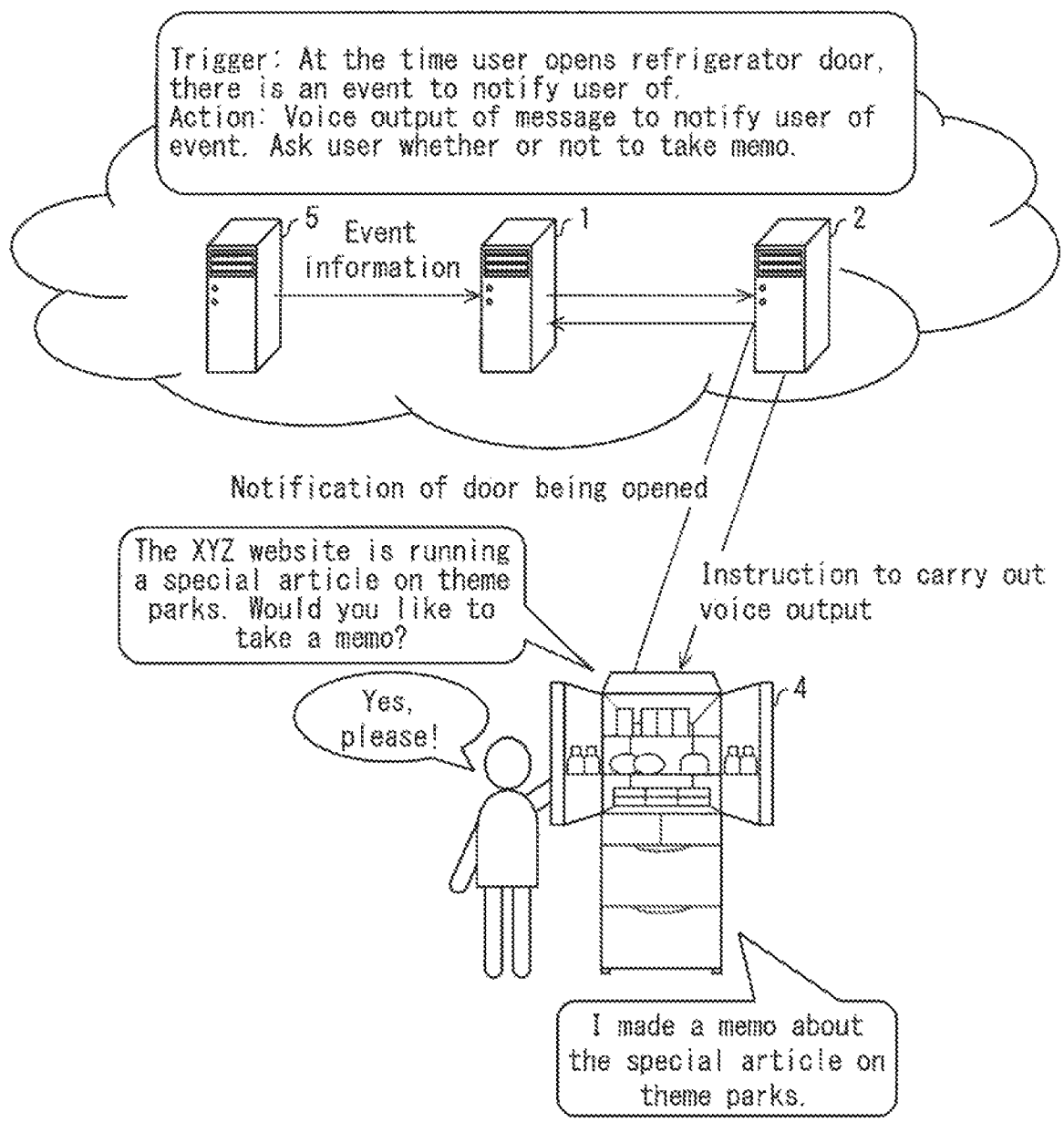
FIG. 17 is a diagram illustrating Embodiment 5 of the present invention and is a diagram illustrating an example configured such that another service can be used following an action of a linking rule.

Discussed in Embodiment 5, with reference to FIG. 17, is an example configured such that another service can be used following an action of a linking rule. FIG. 17 is a diagram illustrating an example configured such that another service can be used following an action of a linking rule. More specifically, in the linking rule as illustrated, the trigger is set as being the presence an event to notify the user of, specifically, the event being present when the user opens a door of a refrigerator. The actions are set as being a device 4 providing information on the event and concurrently outputting, as voice audio, a message asking whether or not the user wants to make a memo containing the information on the event. In the example illustrated, the user can use a memo sharing service by giving an affirmative response to the voice output.

In the present example, the device 4 has a function of notifying a device controlling server 2 when a door of the device 4 is opened. In addition to providing the device controlling service described in the other examples, the device controlling server 2 of the present example also provides a device information providing service for providing notification of an operational status of the device 4 (specifically, that a door of the refrigerator has been opened). Furthermore, the device controlling server 2 of the present example provides a memo sharing service for accepting an electronic memo inputted by the user and providing the electronic memo to members belonging to the same group as the user. Still further, an information providing server 5 of the present example provides an area information service for providing notification of an event in an area designated by the user, the event being selected from events listed on an area information site. As such, when the above linking rule is generated, the trigger services are set to be the device information providing service and an area information managing service, and the action service is set to be the device controlling service and the map information service.

The following description will discuss processing carried out in accordance with this linking rule. Once a user has opened a door of the device 4 which is the refrigerator, the device 4 notifies the device controlling server 2 of such. The device controlling server 2 then transmits, to the linking server 1, a user ID of the user of the device 4 and a notification indicating that the door of the device 4 has been opened.

After receiving the notification, the linking server 1 transmits the user ID, received with the notification, to the information providing server 5 which provides the area information service. Next, in a case where, out of area information for an area registered by the user having the user ID, there is area information which the user has not been notified of, the information providing server 5 transmits that area information to the linking server 1. Once the linking server 1 receives area information from the information providing server 5, the linking server 1 determines that there is an event of which the user should be notified (i.e., that the trigger condition has been fulfilled) and determines that the action should be carried out. After determining that the action should be carried out, the linking server 1 instructs the device controlling server 2 to cause the device 4 to output, as voice audio, a message which (i) provides the area information which has been received and (ii) asks whether or not the user wants to make a memo containing the information on the event.

The above processing makes it possible to cause the device 4 which is the refrigerator to notify the user of event information listed on an area information site when the user opens a door of the device 4. In a case where the user provides an affirmative response (in the example illustrated, "Yes, please!") to the question of whether or not to make a memo, the memo sharing service saves information (area information) about the event as an electronic memo that can be shared across the group. In this way, convenience for the user is further enhanced by allowing the user to use another service (in this example, the memo sharing service) following an action of the linking rule by responding to the action. Note that the service to be used following the action is not particularly limited. For example, an EC service can display, on an operation terminal 3 or TV belonging to the user, a purchase screen for purchasing, for example, a product relating to the event (in the example illustrated, a ticket to a theme park).

Embodiment 6

Figure 18:
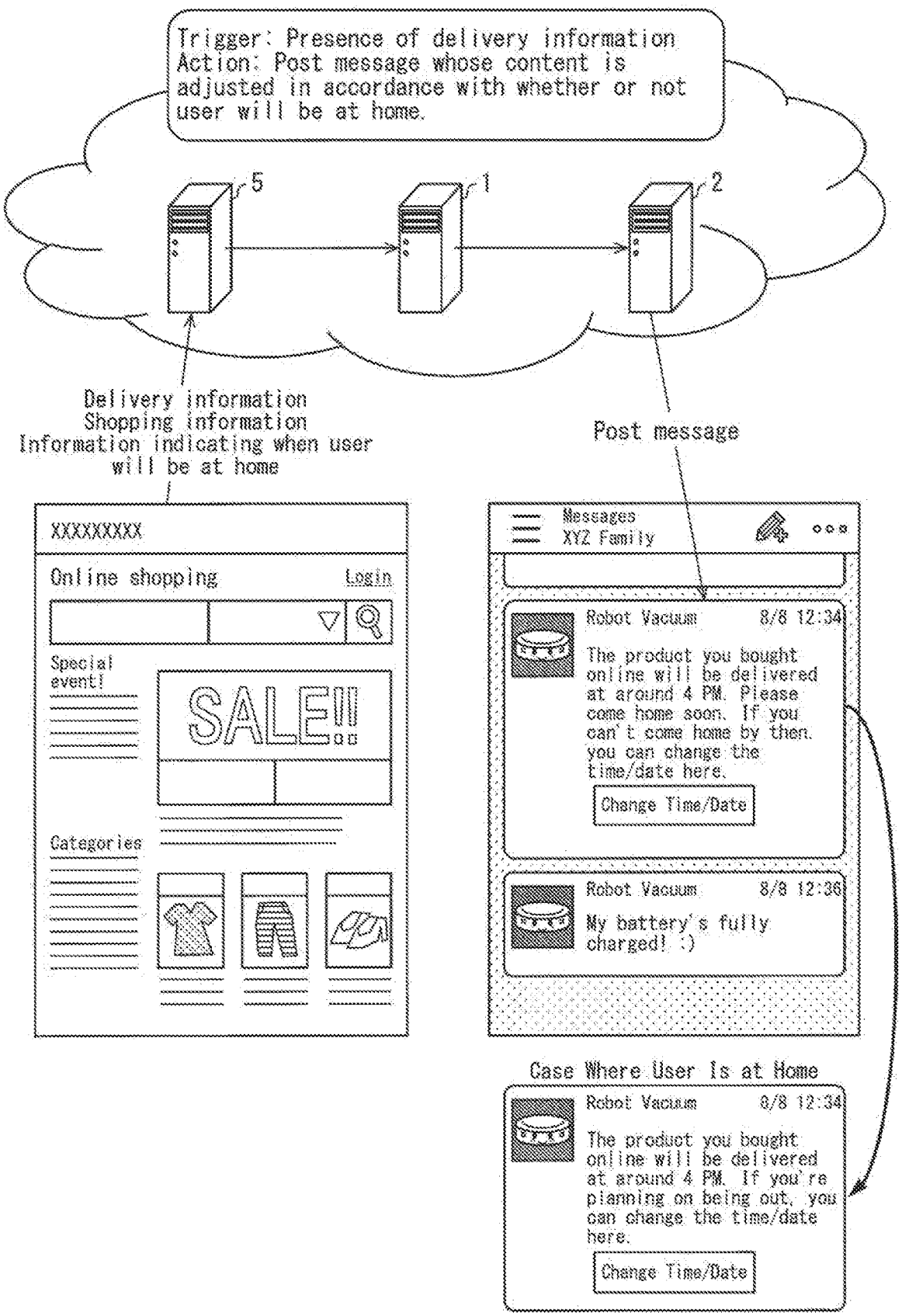
FIG. 18 is a diagram illustrating Embodiment 6 of the present invention and is a diagram illustrating an example of a linking rule in which an action is set as being a message being posted on an electronic bulletin board as a message from a device.

Discussed in Embodiment 6, with reference to FIG. 18, is an example of a linking rule set so that, instead of causing a device 4 itself to carry out an action, the action is set as being posting a message on an electronic bulletin board as a message from the device 4. FIG. 18 is a diagram illustrating an example of a linking rule in which an action is set as being a message being posted on an electronic bulletin board as a message from the device 4. More specifically, in the linking rule as illustrated, the trigger is set as being the presence of delivery information for online shopping, and the action is set as being a message in accordance with the delivery information being posted to the electronic bulletin board as a message from the device 4.

A device controlling server 2 of the present example provides a bulletin board service for accepting messages posted by group members to the electronic bulletin board and allowing group members to view posted messages. The device controlling server 2 also generates and posts messages from devices 4 related to the group and allows the messages to be viewed in the same manner as messages from group members. Note that when allowing a message to be viewed, the device controlling server 2 may display posted messages in chronological order (on a timeline) as illustrated in FIG. 18.

An information providing server 5 of the present example provides a shopping information providing service for providing information relating to online shopping. Specifically, the information providing server 5 provides a service which receives notification of a user ID and then provides (i) information indicating a product purchased online by the user having the user ID, (ii) information indicating the shipping date/time of the product, and (iii) information, entered by the user at the time of purchasing the product, indicating when the user will be at home. In the present example, the trigger service is set to be the shopping information providing service, and the action service is set to be the bulletin board service posting a message from the device 4.

The following description will discuss processing carried out in accordance with this linking rule. At a predetermined time, the linking server 1 notifies the information providing server 5 of a user ID and confirms whether or not there is delivery information for the user having the user ID. In a case where there is delivery information, the linking server 1 obtains, from the information providing server 5, the delivery information and information indicating when the user will be at home. The linking server 1 then transmits, to the device controlling server 2, the information thus obtained and instructs the device controlling server 2 to post a message.

After receiving the above instruction, the device controlling server 2 generates a message which informs the user of the time indicated in the delivery information. The device controlling server 2 then posts the message to an electronic bulletin board corresponding to a group to which the user belongs. The message is posted as a message from the device 4 (specifically, a robotic vacuum cleaner).

The message can differ in accordance with the information indicating when the user will be at home. For example, in the example illustrated, in a case where the delivery time indicated in the delivery information is not within a time period indicated in the information indicating when the user will be home, the message includes a message ("Come home soon.") oriented to the user who will be out at the time of delivery. In a case where the delivery time indicated in the delivery information is within a time period indicated in the information indicating when the user will be home, the message includes a message ("If you plan to be out . . . ") oriented to the user who plans on being home at the time of delivery.

These messages further include a "Change Time/Date" key for changing the tune/date of the delivery. This key links to a site for changing the time/date of delivery. Selecting this key enables the user to easily change the time/date of delivery.

Embodiment 7

Figure 19:
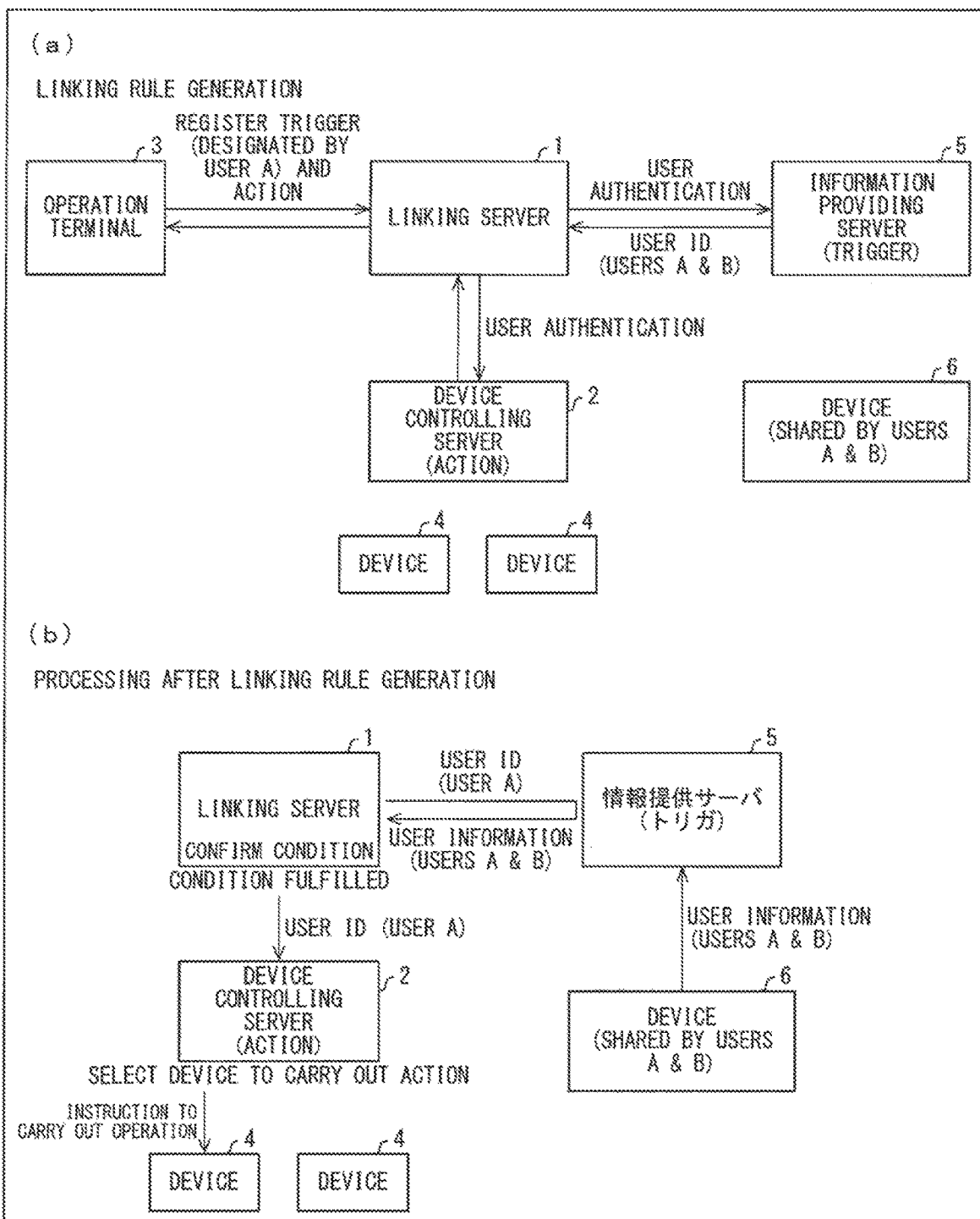
FIG. 19 is a diagram illustrating Embodiment 7 of the present invention and is a diagram schematically illustrating processing for generating a linking rule and processing carried out in accordance with the linking rule thus generated.

The following description will discuss, with reference to FIG. 19, (i) processing for generating a linking rule in accordance with Embodiment 7 and (ii) processing carried out in accordance with the linking rule thus generated (processing which uses the linking rule) in accordance with Embodiment 7. FIG. 19 is a diagram schematically illustrating processing for generating a linking rule and processing carried out in accordance with the linking rule thus generated. Discussed in Embodiment 7 is an example in which a linking rule is generated such that a device 4 is caused to carry out an action when a trigger occurs, the trigger being a device 6 outputting predetermined information. The device 6 is configured to output information in accordance with a user of the device 6.

The device 6 is not particularly limited and may be any device which outputs information in accordance with the user thereof. Discussed here is an example in which the device 6 is a blood pressure meter which measures the user's blood pressure and outputs a measured value. Furthermore, discussed in Embodiment 7 is an example in which an information providing server 5 provides a blood pressure information providing service which receives a blood pressure value for each user of the device 6 and provides notification of the blood pressure values. Note also that (i) the trigger condition is set as being, out of blood pressure values for user A and user B who use the device 6, the blood pressure value for user A exceeding an upper limit value and (ii) the action is set as being the device 4 outputting, as voice audio, a message prompting user A to take note of user A's high blood pressure.

In the present example, out of user A and user B, only user A has carried out user registration for the blood pressure information providing service. However, user A has registered user IDs for both users in order for the blood pressure information providing service to differentiate between user A and user B. The device 6 is configured to output (i) a user ID of a user whose blood pressure will be measured and (ii) blood pressure value of the user. This makes it possible for the information providing server 5 to identify which user's blood pressure value has been outputted by the device 6.

In this example, during generation of the linking rule, an operation terminal (terminal device) 3 is used to set a trigger service and an action service in the linking server 1, as illustrated in (a) of FIG. 19.

During setting of the trigger service, an operation terminal 3 first carries out user authentication for the trigger service via a linking server 1. Specifically, the operation terminal 3 transmits, via the linking server 1 and to the information providing server 5, a user ID and password for the blood pressure information providing service. Once the authentication has succeeded, the information providing server 5 transmits, to the linking server 1, the user ID (user identification information) of the successfully authenticated user. This makes it possible, from this point onward, for the linking server 1 to use the user ID to obtain, from the information providing server 5, information indicating a blood pressure value as measured by the device 6.

The operation terminal 3 sets a trigger condition (an event that triggers an action) which utilizes the service provided by the information providing server 5. The operation terminal 3 then notifies the linking server 1 of such. Here, the trigger condition is set as being user A's blood pressure value being greater than or equal to a predetermined value. In other words, the trigger condition includes information indicating user A.

Furthermore, the operation terminal 3 carries out setting of an action via processing as in the above embodiments. The operation terminal 3 then transmits, to the linking server 1, information indicating the action set thusly. The linking server 1 then generates a linking rule by associating the action with the trigger condition described above.

The following description will discuss, with reference to (b) of FIG. 19, processing after the linking rule has been generated. After generating the linking rule, the linking server 1 periodically transmits a user ID (user A's user ID) to the information providing server 5. Upon receiving the user ID, the information providing server 5 transmits, to the linking server 1, (i) information indicating a blood pressure value as measured by the device 6 and (ii) the user ID of the user whose blood pressure was measured.

The blood pressure value which the information providing server 5 transmits to the linking server 1 may be that of user A in some cases and may be that of user B in some cases. In a case where the linking server 1 has received the user ID of user A, the linking server 1 determines whether or not the blood pressure value is greater than or equal to a predetermined value. In a case where the blood pressure value is greater than or equal to the predetermined value, the linking server determines that the condition has been fulfilled and causes the action of the linking rule to be carried out. Specifically, the linking server 1 notifies the device controlling server 2 of (i) a user ID (user ID for the device controlling service) and (ii) a device ID of a device 4 which will be caused to carry out the action. This causes the device controlling server 2 to transmit, to the device 4 having the device ID received from the linking server 1, an instruction to carry out an operation. The device controlling server 2 thereby causes the device 4 to carry out the action of the linking rule.

In Embodiment 7, the action is desirably carried out in a manner such that it is clear that the action is related to user A. For example, in a case where the device 4 is caused to output, as voice audio, a message saying "Your blood pressure is a bit high today," the detection of user A by the device 4 can serve as a trigger for the output. The device 4 may also output, as voice audio, a message including information which indicates that the outputted information relates to user A, such as "Person A, your blood pressure is a bit high today."

Embodiment 8

Figure 20:
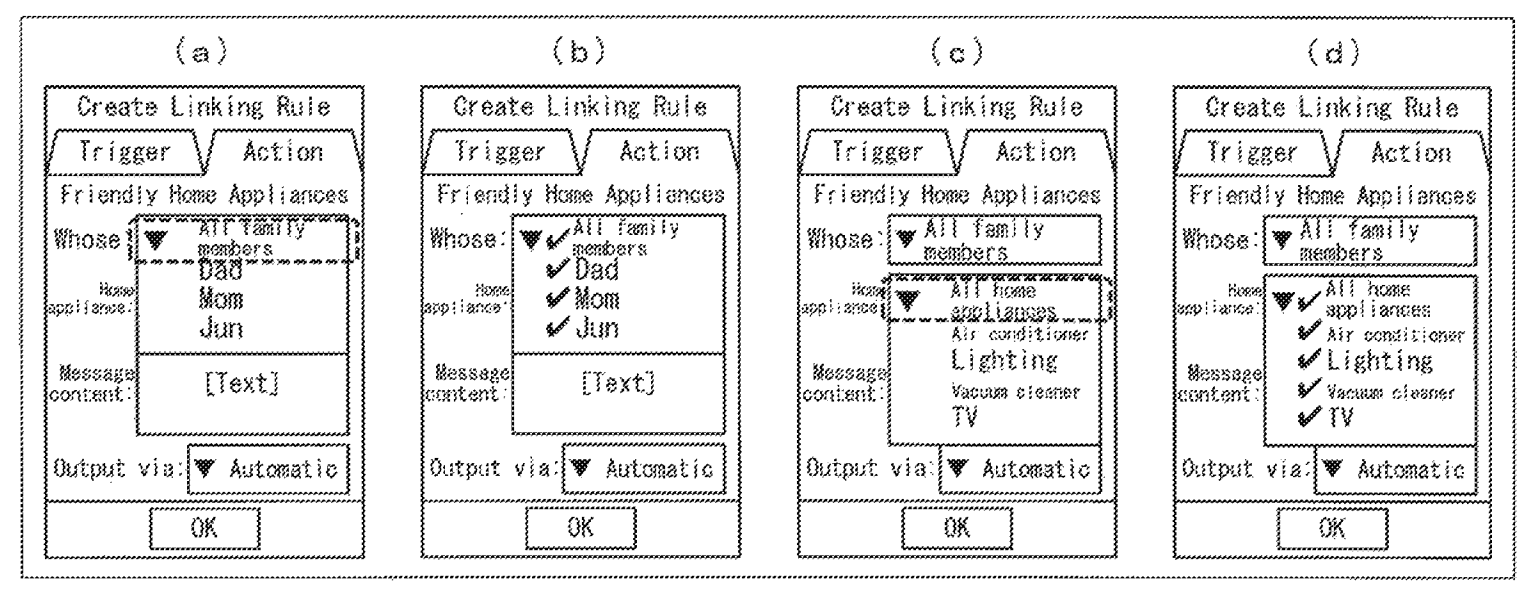

Discussed in the above embodiments were examples in which a group member and a device 4 were selected on an individual basis during setting of a linking rule. However, it is possible to employ a configuration in which a plurality group members and a plurality of devices 4 can be selected collectively. Discussed in Embodiment 8, with reference to FIG. 20, is an example of a configuration in which a plurality of group members and a plurality of devices 4 can be chosen collectively. FIG. 20 is a diagram illustrating another example of an operation screen which allows a user to set an action.

As illustrated in (a) of FIG. 20, in the operation screen of FIG. 20, a drop down list for selecting members of a group (Family) includes an option ("All family members") for selecting all members of the group. Selecting this option causes all members to be selected collectively (such that a check appears by all members), as illustrated in (b) of FIG. 20. Note that it is possible to deselect a selected member by repeating a selection operation for that member.

In a case where all members have been selected as illustrated in (b) of FIG. 20, the operation screen displays, as selectable options, devices 4 for which at least one of the members is a permitted user. As illustrated in (c) of FIG. 20, in the operation screen of FIG. 20, a drop down list for selecting devices 4 (home appliances) includes an option ("All home appliances") for selecting all of the devices 4. Selecting this option causes all of the devices 4 which are selectable options to be selected collectively (such that a check appears by all devices 4), as illustrated in (d) of FIG. 20. Note that it is possible to deselect a selected device 4 by repeating a selection operation for that device 4.

In this way, the operation screen of FIG. 20 is configured such that all of the devices 4 for which at least one member is a permitted user can be easily selected collectively. This is useful in a case where, for example, a user wishes to collectively turn off all home appliances in the user's home before leaving the home for travel or the like.

Embodiment 9

Figure 21:
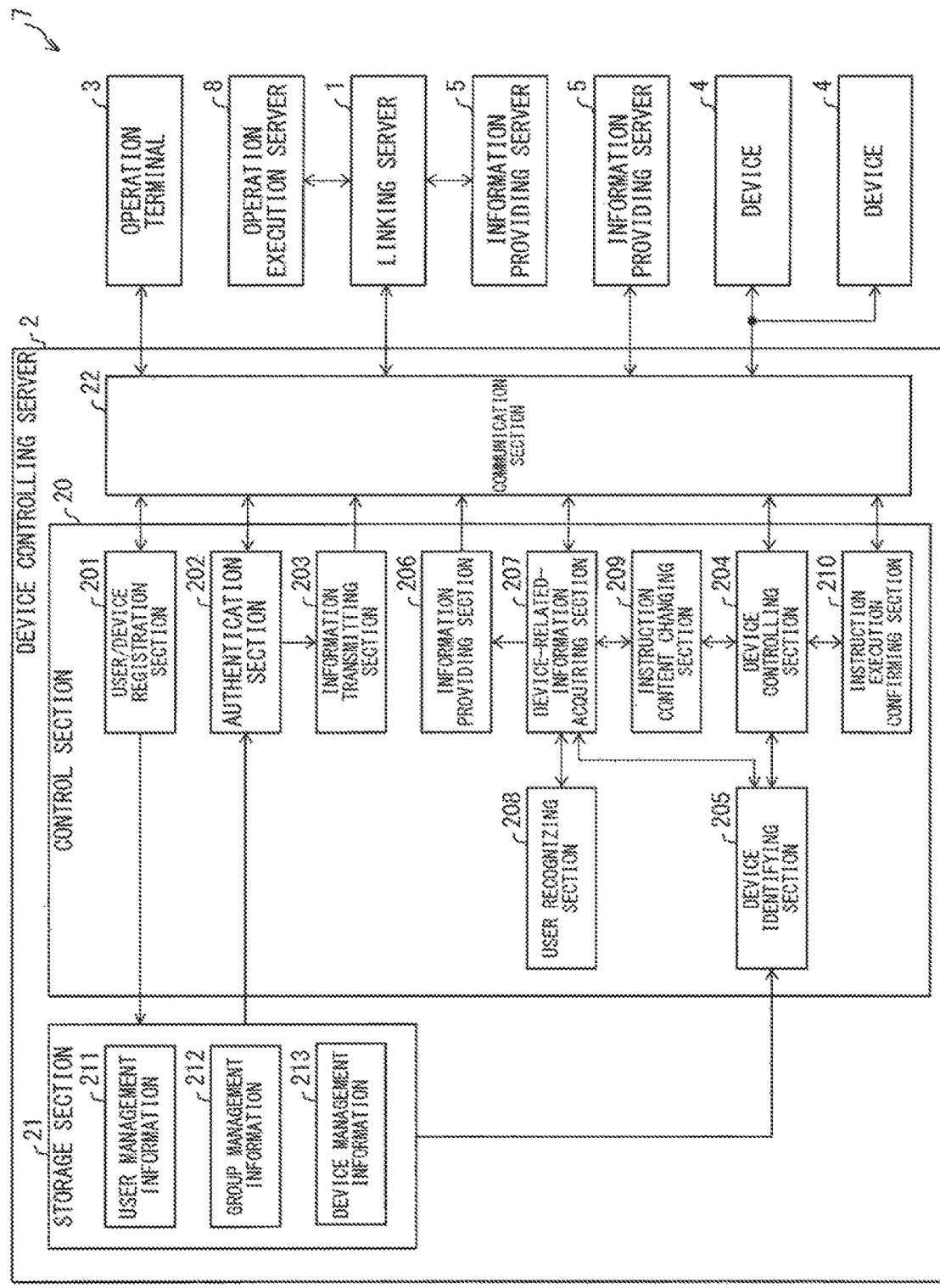
FIG. 21 is a block diagram illustrating an example configuration of main parts of a device controlling server included in a linking system in accordance with Embodiment 9 of the present invention.
Figure 22:
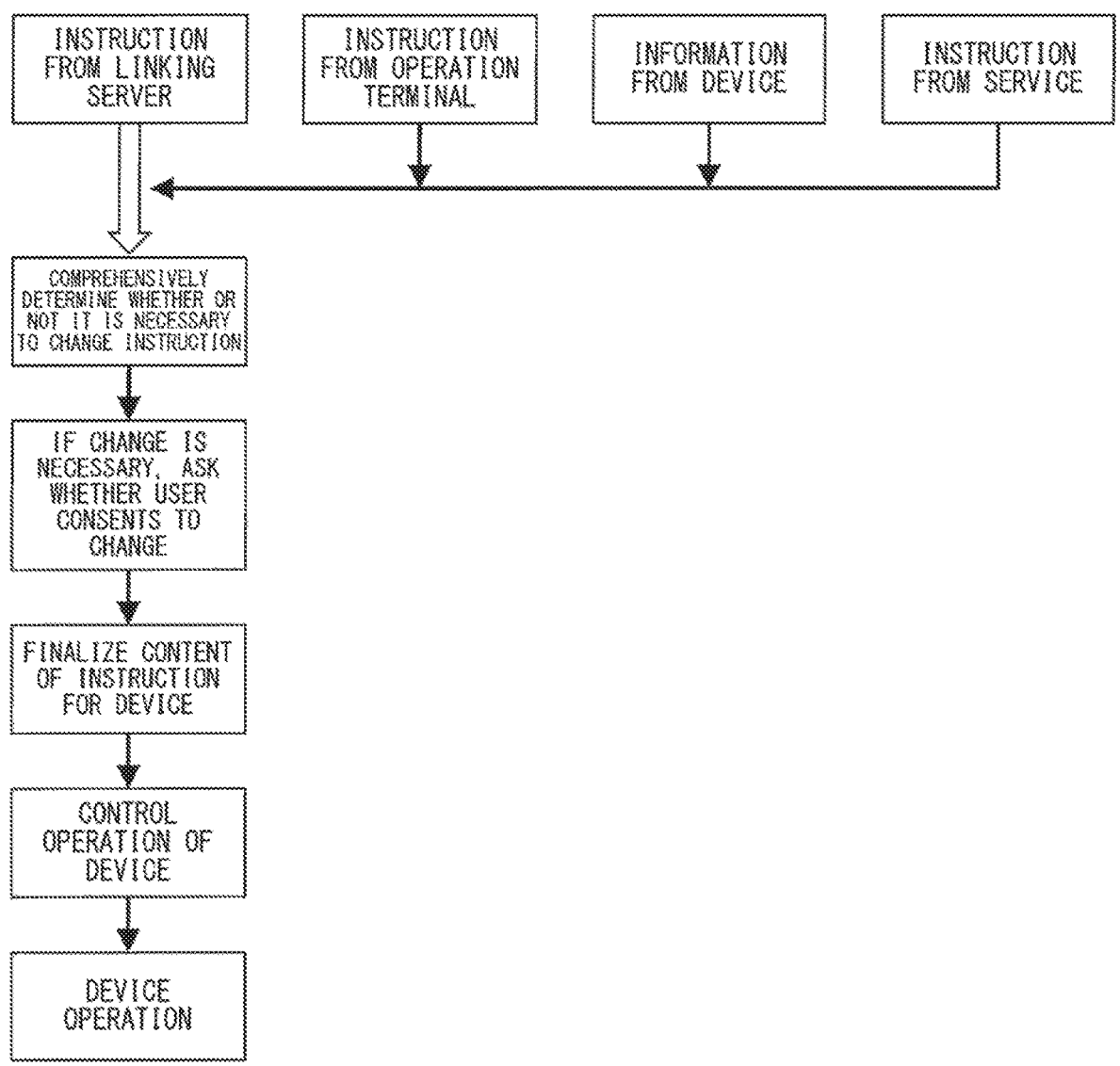
FIG. 22 is a diagram illustrating a flow of processing carried out by the device controlling server in a case where, after determination of whether or not it is necessary to change content of an instruction for a device, content of the instruction for the device has been finalized.

The following description will discuss, with reference to FIGS. 21 and 22, another embodiment in accordance with the present invention. FIG. 21 is a block diagram illustrating an example configuration of main parts of a device controlling server (information providing server) 2 included in a linking system 7 in accordance with Embodiment 9. The device controlling server 2 of FIG. 21 differs from the device controlling server 2 of FIG. 1 in that the former includes an information providing section 206, a device-related-information acquiring section 207, a user recognizing section 208, an instruction content changing section 209, and an instruction execution confirming section 210.

The information providing section 206 provides information relating to a device 4. The information relating to the device 4 is acquired by the device-related-information acquiring section 207. The information providing section 206 provides the information to a device identifying section 205 and the instruction content changing section 209. The information providing section 206 also provides the information to a linking server 1 in a case where the linking server 1 makes a request for such.

In other words, by including the information providing section 206, the device controlling server 2 of Embodiment 9 also functions as an information providing server. Furthermore, in the linking system 7 of Embodiment 9, an operation execution server 8 provides an action service. In this way, the action service can be a service other than the device controlling service. Furthermore, information provided by the device controlling server 2 can serve as a trigger for the device controlling server 2 to cause the device 4 to carry out an action. In such a case, it can be said that the device controlling server 2 is both an information providing server and an operation execution server.

The device-related-information acquiring section 207 acquires information relating to the device 4. Specifically, the device-related-information acquiring section 207 acquires information indicating an operational status of the device 4. For example, the device-related-information acquiring section 207 acquires, from the device 4, information indicating such things as (i) whether or not the device 4 is turned on, (ii) whether or not the device 4 is performing an operation, and (iii) in a case where the device 4 is performing an operation, what sort of operation is being performed. The device-related-information acquiring section 207 may also (i) acquire information relating to the device 4 by, for example, accessing another server and (ii) acquire, as information relating to the device 4, information relating to a user of the device 4. Information acquired by the device-related-information acquiring section 207 can be used as a trigger in a linking rule.

The user recognizing section 208 is for recognizing a user of the device 4. Specifically, the user recognizing section 208 recognizes which member, out of a group to which the device 4 belongs, a user is. The recognizing section 208 accomplishes this by analyzing audio spoken by the user as obtained by the device 4, an image of the user, and/or the like.

The instruction content changing section 209 determines (i) whether or not it is necessary to cancel the execution of an instruction from the linking server 1, which instruction is in accordance with a linking rule or (ii) whether or not it is necessary to change the content of the instruction. In a case where the instruction content changing section 209 determines that cancellation is necessary, the instruction content changing section 209 cancels the execution. In a case where the instruction content changing section 209 determines that a change is necessary, the instruction content changing section 209 changes the content of the instruction.

In a case where the instruction execution confirming section 210 has received an instruction for carrying out an action in accordance with a linking rule, the instruction execution confirming section 210 asks the user whether or not the action should be carried out. Specifically, the instruction execution confirming section 210 transmits, to a predetermined device to be notified, a message asking whether or not the action should be carried out and causes the device to output the message. The instruction execution confirming section 210 then receives, from the device, a response to the message (a response in accordance with an input operation by the user who received the message). The instruction execution confirming section 210 then determines, in accordance with the content of the response, whether or not the action should be carried out.

The device to be notified need only be a device 4 capable of displaying, to a user who will decide whether or not the action should be carried out, the message asking whether or not the action should be carried out. The device to be notified can be, for example, a device 4 which is to be caused to carry out the action or an operation terminal 4 belonging to the user. The device to be notified may alternatively be another device 4 related to the user (for example, a device 4 for which the user is a permitted user, or a device 4 for which a member of the same group as the user is a permitted user).

[Changing Content of Instruction]

The following description will discuss, with reference to FIG. 22, how content of an instruction is changed. FIG. 22 is a diagram illustrating a flow of processing carried out by the device controlling server 2 in a case where, after determination of whether or not it is necessary to change content of an instruction for a device 4, content of the instruction for the device 4 has been finalized.

Once the device controlling section 204 receives, from the linking server 1, instructions to control the device 4 in accordance with a linking rule, the device controlling section 204 notifies the instruction content changing section 209 of such. After receiving the notification, the instruction content changing section 209 determines whether or not it is necessary to change the content of the instruction. The instruction content changing section 209 makes this determination in a comprehensive manner in accordance with (i) an instruction from the user via the operation terminal 3, (ii) information relating to the device 4 as acquired by the device-related-information acquiring section 207, and (iii) an instruction from another service. The information used in determining whether or not it is necessary to change the instruction need only be at least one of (i) information relating to the device 4 and (ii) information relating to the user of the device 4. The information used in the determining is not limited to the examples described here.

In a case where instruction content changing section 209 determines that a change is necessary, the instruction content changing section 209 notifies the device controlling section 204 of an instruction having changed content. The device controlling section 204 then forwards this notification to the instruction execution confirming section 210, and the instruction execution confirming section 210 asks the user whether or not the change is necessary (whether or not to carry out changed processing). This asking may be carried out by, for example, displaying a message for asking such on the user's operation terminal 3 and allowing the user to select whether or not the change is necessary. In a case where the user approves the change, the instruction execution confirming section 210 notifies the device controlling section 204 of such. This establishes that the device 4 is to be controlled in accordance with the instruction having the changed content. Thereafter, the device controlling section 204 controls the device 4 so as to operate in accordance with the instruction having the changed content.

For example, assume a case where (i) the instruction from the linking server 1 is an instruction to output, via voice audio, a message saying "Dad has left work, so please start making dinner," and (ii) a device 4, which is a refrigerator, has provided notification to the device controlling server 2 that there is saury in the refrigerator. In such a case, the instruction content changing section 209 changes the instruction by adding, to the message, a message relating to saury. This makes it possible to provide advice in accordance with ingredients in the refrigerator, such as "Dad has left work, so please start making dinner. How about saury for dinner?"

An instruction for the device 4 in accordance with a linking rule can be cancelled by similar processing. For example, assume a case where (i) the instruction from the linking server 1 is an instruction to output, via voice audio, a message saying "It will rain soon. Make sure to select a drying function!" and (ii) a device 4, which is a washing machine, has provided notification to the device controlling server 2 that the device 4 is currently carrying out drying. In such a case, the instruction content changing section 209 determines that it is unnecessary to output the message and cancels the instruction.

Embodiment 10

Figure 23:
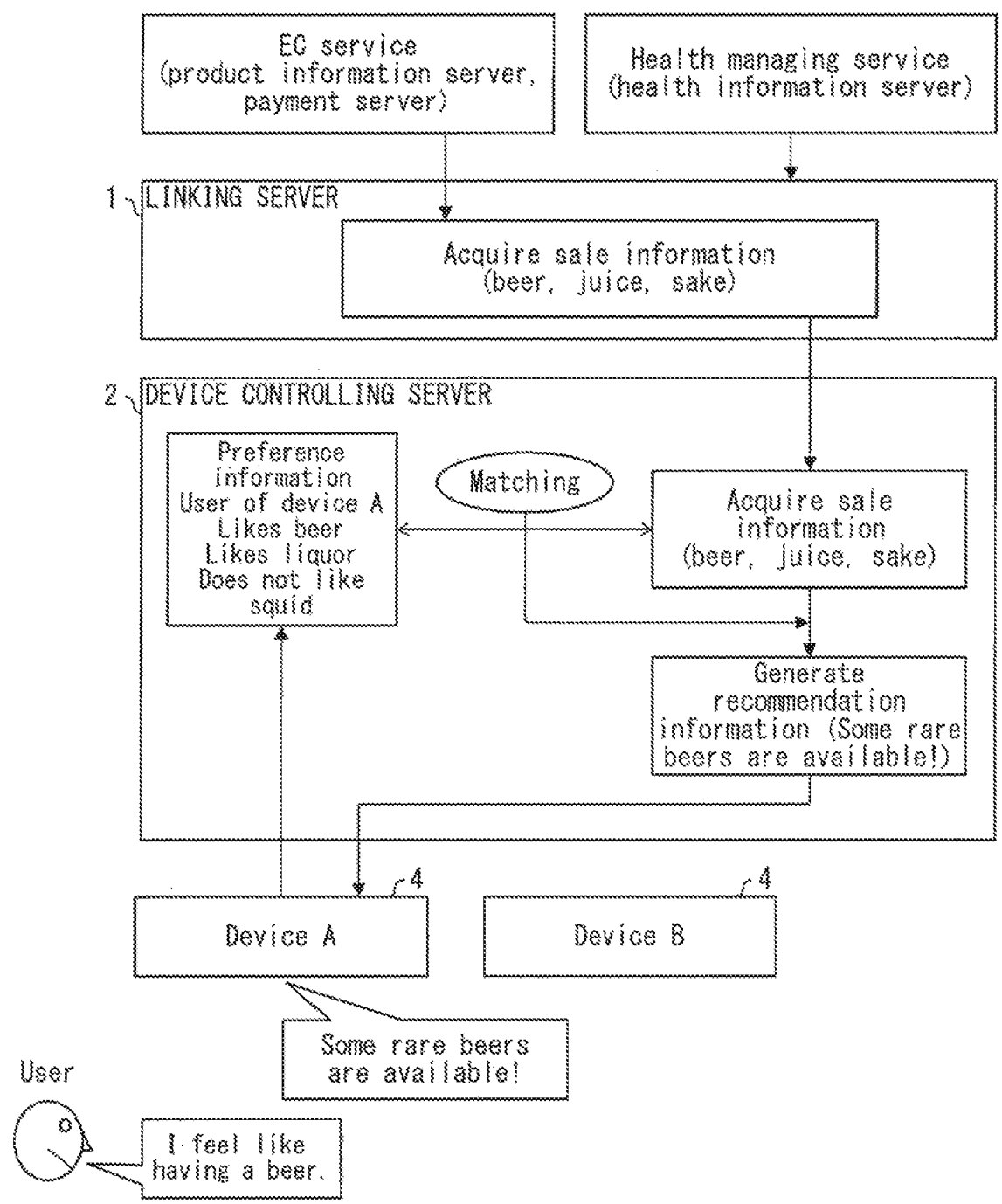
FIG. 23 is a diagram illustrating Embodiment 10 of the present invention and is a diagram illustrating an example in which preference information is used in changing content of an instruction.

Discussed in Embodiment 10, with reference to FIG. 23, is an example in which preference information for a user is used in changing content of an instruction. FIG. 23 is a diagram illustrating an example in which preference information is used in changing content of an instruction. In the example illustrated, an EC service and a health managing service are shown as examples of a trigger service. A server which provides the EC service includes (i) a product information server for managing information on products to be sold online and (ii) a payment server for handling payment in online shopping. The health managing service is provided by a health information server which manages information relating to user health.

The present example illustrates processing carried out in accordance with a linking rule in which (i) the trigger is set as being a user speaking a phrase related to drinks, and (ii) the action is set as being a device 4 outputting, as voice audio, sale information relating to drinks.

In a case where a user speaks a phrase related to drinks, the device 4 acquires the audio spoken by the user and transmits the audio to a device controlling server 2. The device controlling server 2 then analyzes the audio and identifies that a phrase related to drinks was spoken. Because the device 4 which acquired the audio spoken by the user is "device A" as illustrated in FIG. 23, the device controlling server 2 determines that it was the user of the device A who spoke the phrase related to drinks. The device controlling server 2 then notifies a linking server 1 that a phrase related to drinks was spoken. Upon receiving this notification, the linking server 1 determines that the trigger condition has been fulfilled. The linking server 1 then obtains sale information from the product information server, transmits the sale information to the device controlling server 2, and instructs the device controlling server 2 to cause the device 4 to output the sale information as voice audio. Note that the sale information includes sale information for beer, juice, and sake.

After the device controlling server 2 receives the sale information, an instruction content changing section 209 in the device controlling server 2 performs matching between (i) preference information, for the user of the device A, which has been stored in advance by the instruction content changing section 209 and (ii) products included in the sale information. The instruction content changing section 209 then determines that the device 4 should carry out voice output relating to beer, which suits the user's preferences. The instruction content changing section 209 then generates recommendation information (for example, a message saying "Some rare beers are available!") for recommending beer to the user and causes the device A to output the recommendation information as voice audio. This makes it possible to recommend a product suited to the user's preferences and therefore makes it possible to increase the likelihood that a product will be purchased. Note that, because a user who has spoken to the device A may not necessarily be the user of the device A, a user recognizing section 208 may carry out user recognition. In such a case, the instruction content changing section 209 generates recommendation information in accordance with (i) preference information for each user, which has been stored in advance by the instruction content changing section 209 and (ii) results of the recognition carried out by the user recognizing section 208.

Embodiment 11

Figure 24:
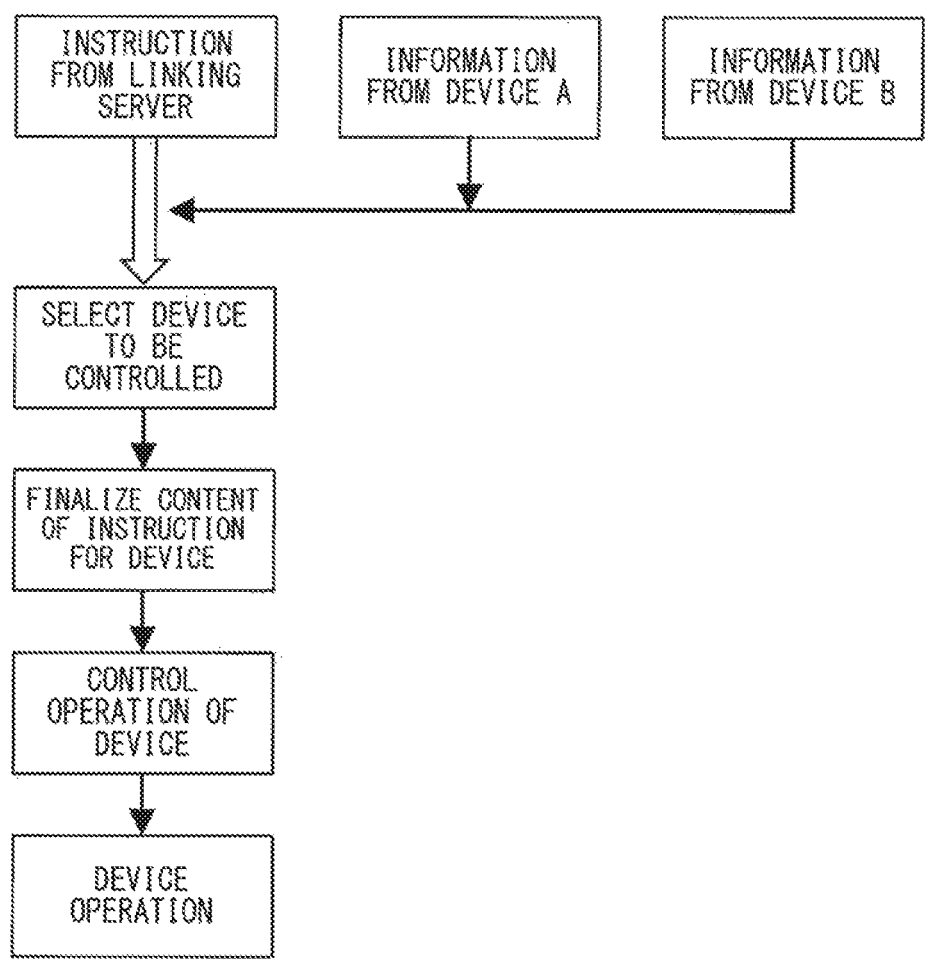
FIG. 24 is a diagram illustrating Embodiment 11 of the present invention and is a diagram illustrating a flow of processing carried out by the device controlling server in a case where (i) a device to be controlled is to be determined in accordance with information from the device and (ii) the device thus determined is to be caused to carry out an operation.

Discussed in Embodiment 11, with reference to FIG. 24, is an example in which a device 4 to be controlled is determined in accordance with information from the device 4. FIG. 24 is a diagram illustrating a flow of processing carried out by a device controlling server 2 in a case where (i) a device 4 to be controlled is to be determined in accordance with information from the device 4 and (ii) the device 4 thus determined is to be caused to carry out an operation. Note that in the example illustrated in FIG. 24, content of an instruction may be changed as in the examples of FIG. 22 and FIG. 23.

Once a device controlling section 204 receives, from a linking server 1, an instruction for carrying out an operation in accordance with a linking rule, the device controlling section 204 instructs a device identifying section 205 to select a device 4 to carry out the operation. The device identifying section 205 of Embodiment 11 is configured to (i) identify each device 4 which is capable of carrying out the operation (in the example illustrated, Device A and Device B) by referring to device management information 213 and (ii) acquire, from a device-related-information acquiring section 207, information indicating an operational status of each device 4 thus identified. The device identifying section 205 then determines, in accordance with the information thus acquired, which device 4 will be caused to carry out the operation. The device identifying section 205 then notifies the device controlling section 204 of the device 4 thus determined. In this way, the device controlling section 204 causes the device 4 to carry out a predetermined operation.

For example, assume a case where the instruction from the linking server 1 is an instruction to output, via voice audio, a message for "Dad" which says "New liquor is available!" In such a case, if a device 4 which is a refrigerator provides notification that it has detected "Mom," and a device 4 which is a TV provides notification that it has detected "Dad," then the device 4 which is the TV becomes the device 4 to be controlled (the device which is caused to output the message). In a case where it is the TV which will be controlled, since the TV is capable of not only audio output but also image display, the TV may display an image relating to the message (for example, an image of liquor).

A method for detecting a user is not particularly limited. In a case where, for example, a device 4 has a function of acquiring voice audio spoken by the user, the user can be identified by acquiring and analyzing voice audio spoken by the user. In the above example, in a case where (i) the device 4 which is the refrigerator acquires voice audio of "Mom" saying "I wonder what I should make for dinner," and (ii) the device 4 which is the TV acquires voice audio of "Dad" saying "TV show recommendations, please," a user recognizing section 208 can analyze this voice audio. Note that a device 4 may carry out the user recognition via audio analysis. Furthermore, in a case where a device 4 has an image capture function, it is possible to recognize users in the vicinity of the device 4 by analyzing a captured image. A device for carrying out this image analysis is not particularly limited. A device 4 may carry out the image analysis, or a captured image may be sent to the device controlling server 2 and analyzed by the user recognizing section 208.

Embodiment 12

Figure 25:
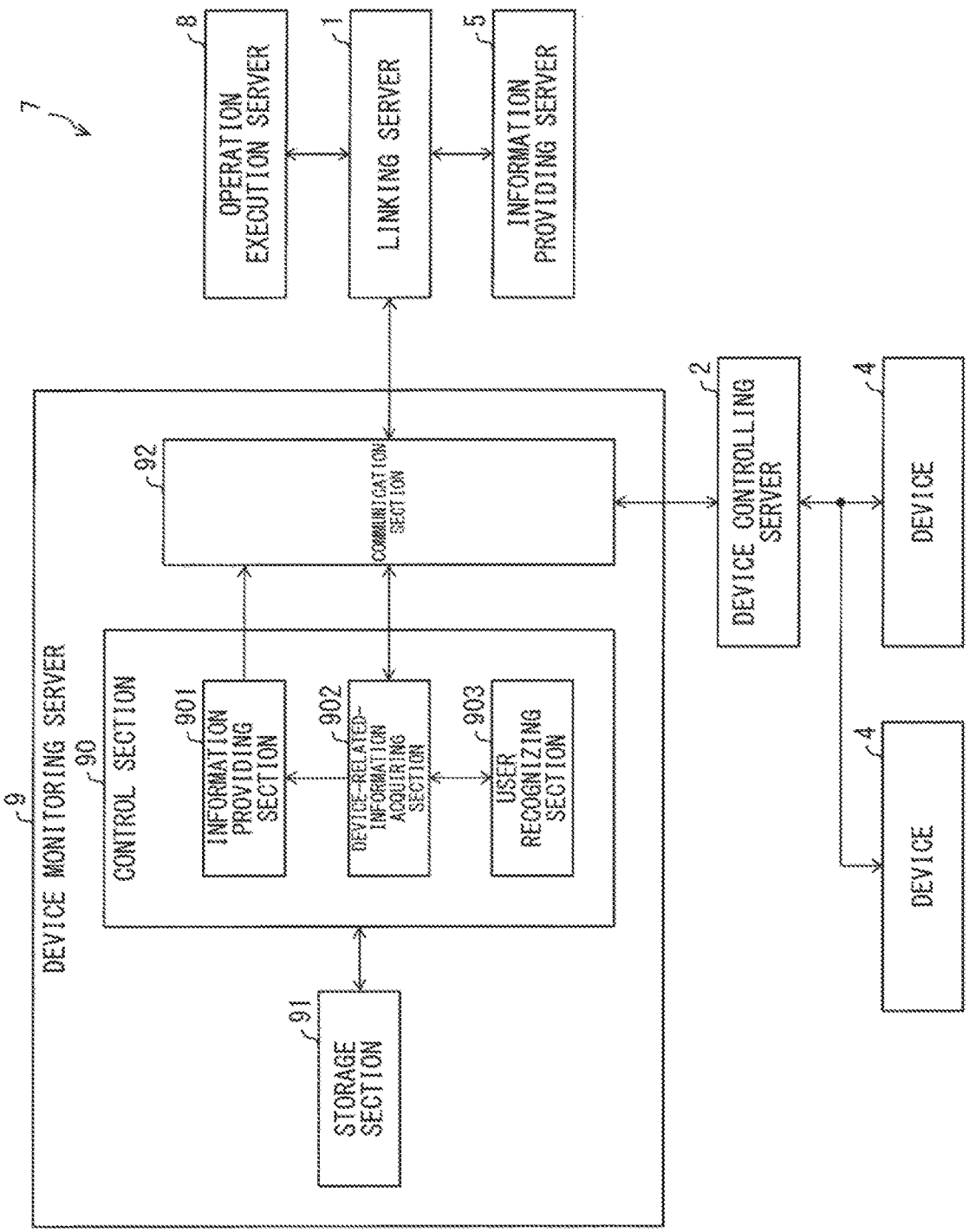
FIG. 25 is a block diagram illustrating an example configuration of main parts of a device monitoring server included in a linking system in accordance with Embodiment 12 of the present invention.

The following description will discuss, with reference to FIG. 25, another embodiment in accordance with the present invention. Discussed in the preceding embodiments were examples in which the device controlling server 2 notified the linking server 1 of a status of a device 4. However, it is possible for a server (service) other than the device controlling server 2 to provide notification of a status of a device 4. Discussed in Embodiment 12 is a linking system 7 which includes a device monitoring server (information providing server) 9 for notifying a linking server 1 of a status of a device 4.

FIG. 25 is a block diagram illustrating an example configuration of main parts of the device monitoring server 9 included in the linking system 7 in accordance with Embodiment 12. Note that the linking system 7 of Embodiment 12 includes an operation execution server 8. The operation execution server 8 is a server for providing an action service, as described above.

The device monitoring server 9 includes (i) a control section 90 for comprehensively controlling each section of the device monitoring server 9, (ii) a storage section 91 for storing various data used by the device monitoring server 9, and (iii) a communication section 92 for allowing the device monitoring server 9 to communicate with other devices. The control section 90 includes an information providing section 901, a device-related-information acquiring section 902, and a user recognizing section 903.

The information providing section 901 provides information relating to a device 4. The information relating to the device 4 is information acquired by the device-related-information acquiring section 902. The information providing section 901 provides the information to a user of a device monitoring service (more specifically, an operation terminal 3 belonging to the user). The information providing section 901 also provides the information to a linking server 1 in a case where the linking server 1 makes a request for such.

The device-related-information acquiring section 902 acquires information indicating a status of a device 4. For example, the device-related-information acquiring section 902 acquires, from a device controlling server 2, information indicating such things as (i) whether or not the device 4 is turned on, (ii) whether or not the device 4 is performing an operation, and (iii) in a case where the device 4 is performing an operation, what sort of operation is being performed. Note that the device-related-information acquiring section 902 may acquire this information directly from the device 4 or from another information source.

The user recognizing section 903 is for recognizing a user of the device 4. Specifically, the user recognizing section 903 recognizes which member, out of a group to which the device 4 belongs, a user is. The recognizing section 903 accomplishes this by analyzing audio spoken by the user as obtained by the device 4, an image of the user, and/or the like. Voice audio and images may be obtained (i) from the device controlling server 2, (ii) directly from the device 4, or (iii) from another device, such as a camera installed in a user's home.

Embodiment 13

A linking server 1 may include an origin information transmitting section configured to transmit, to a device controlling server 2, origin information which indicates at least one of (a) through (c) below. The device controlling server 2 may include an origin notification section configured to transmit the origin information to (i) a device 4 which is to be caused to carry out an operation specified in a linking rule or (ii) an operation terminal 3. This makes it possible to allow a user of the device 4 or a user of the operation terminal 3 to confirm how the operation originated.

(a) The linking rule specifying the operation;
(b) a trigger specified in the linking rule; and
(c) information relating to an information providing server.

[Variations]

Illustrated in the preceding embodiments were examples in which a device 4 was a robotic vacuum cleaner, a refrigerator, or the like. Note, however, that the device 4 is not limited to these examples. The device 4 may be, for example, a cooking appliance such as an oven or microwave oven, or a heating appliance. Furthermore, the device 4 may be a device other than a home appliance, such as a smartphone, mobile phone, game device, or a toy.

Furthermore, in the examples of the preceding embodiments in which the device 4 is caused to carry out voice output, it is possible to further employ a configuration for adjusting the timing of the voice output. For example, it is possible to employ a configuration in which the device 4 includes a button for causing the device 4 to output voice audio. In such a configuration, the device 4 may be configured such that (i) the button lights up or blinks when the device 4 has received, from the device controlling server 2, notification of content for voice output and (ii) the device 4 is caused to carry out voice output when the button is pressed. Alternatively, the device 4 can be configured to have, instead of the button, a light that notifies a user of the presence of content for voice output. This notification can be accomplished by the light turning on or blinking when the device 4 has received, from the device controlling server 2, notification of content for voice output. In such a configuration, the device 4 may be triggered to carry out voice output by the user speaking to the device 4 while the device 4 is in a notification state. In such a configuration, it is not preferable for the content of the user's speech to be ignored. It is therefore preferable that the device 4 first responds to the content of the user's speech and then, for example, changes the subject by outputting a phrase such as "By the way, . . . " as voice audio, to be followed by output of the content for voice output as received by the device controlling server 2. Configurations such as these make it possible to cause the device 4 to carry out voice output when the user wants to hear the voice output.

Furthermore, the preceding embodiments discussed examples in which one device 4 was selected to carry out voice output, but a plurality of devices 4 may be selected and each of the plurality of devices 4 may be caused to carry out voice output. In a case where a plurality of devices 4 has been selected, it is possible to employ a configuration in which, out of the plurality of devices 4, a device 4 which first detects the user is caused to carry out voice output, and thereafter, the same voice output is not repeated.

Furthermore, the trigger and the action of a linking rule are not limited to the examples described above. Examples of the trigger encompass examples such as those listed below. Note that in the following examples, it is possible to allow a user to select and enter content shown in parentheses via the operation terminal 3.

(Tomorrow)'s weather forecast for (current location of user) is (rain).

There are delays of (10 minutes) or more on the (ABC railway, XYZ line) at (6 AM).

(Friend: Person A) has posted a message on (social networking service (SNS)).

Examples of the action encompass examples such as those listed below.

Cause (device 4: living room robot) to output, as voice audio, (weather forecast).

Set (device 4: living room air conditioner) to (automatic mode).

Cause (device 4: refrigerator) to output, as voice audio, (predetermined message).

Furthermore, an operation of the device 4 may be controlled by using a linking rule such as the example below.

Trigger: Device 4, which is an air purifier, commencing operation (being switched on). Action: (i) Cause the device 4 to carry out voice output indicating commencement of operation (for example, "I'm going to start operating!") and post, to an electronic bulletin board, a message indicating that the device 4 has commenced operation (for example, in a case where the device 4 is located in the living room. "The living room air purifier has started operating!"), the electronic bulletin board being viewable by members of a group to which the user of the device 4 belongs.

An operation of the device 4 may be controlled using a linking rule such as the example below, in which the above linking rule is arranged to include an information providing service (for example, a weather information service).

Trigger: Device 4, which is an air purifier, commencing operation (being switched on). Action: (i) Acquire, from a weather information service, information indicating an amount of airborne particulate (PM 2.5, pollen, etc.) near the user's home and (ii) in a case where the amount is greater than or equal to a predetermined amount, change an operating mode of the device 4 (increase air intake speed) and cause the device 4 to provide notification of such via voice output. For example, the device 4 can be caused to output, as voice audio, a message such as "There's a large amount of airborne PM 2.5 in the XX region. I'll switch to a high-powered mode." The action may also include, in addition to the voice output, posting a message to an electronic bulletin board (for example, "There's a large amount of airborne PM 2.5 in the XX region. The living room air purifier will switch to a high-powered mode."), as in the example above.

Furthermore, an operation of the device 4 may be controlled by using a linking rule such as the example below.

Trigger: Device 4, which is an air purifier, being caused to start operation (being switched on) from an operation terminal 3 via use of a device controlling service (via the device controlling server 2).

Action: Cause the device 4 to output, as voice audio, a message indicating a reason (origin) for the commencement of operation of the device 4 (for example, "I'm following a request from Dad to switch to a high-powered mode."). Note that this message can include information indicating the operation terminal 3 which was used to utilize the device controlling service. For example, the device 4 can be caused to output, as voice audio, a message such as "I'm following a request from Dad's operation terminal 3 to switch to a high-powered mode."

Embodiment 14

Discussed in the preceding embodiments were examples which each utilized one linking server 1. However, it is possible to use separate servers to realize each function of the linking server 1. In a case where a plurality of servers is employed, each server may be managed by the same operator or by differing operators. The same applies to each of the servers described above, such as the device controlling server 2.

Note that each of the servers described above may be a computer system constituted by a single computer or a system constituted by a group of computers, such as a group including a plurality of computers, a database, and a load balancer. In other words, each of the servers described above may be (i) a computer system which realizes a predefined function via a body (device) which is singular in a physical sense, or (ii) a computer system which realizes a predefined function via a body (constituted by a plurality of devices) which is singular in a theoretical sense.

Embodiment 15

Each block of the linking server 1, the device controlling server 2, the operation terminal 3, and the device 4 can be realized by a logic circuit (hardware) provided in an integrated circuit (IC chip) or the like or can be alternatively realized by software as executed by a central processing unit (CPU). In the latter case, the linking server 1, the device controlling server 2, the operation terminal 3, and the device 4 each be realized by a computer (electronic computer) as illustrated in FIG. 26.

Figure 26:
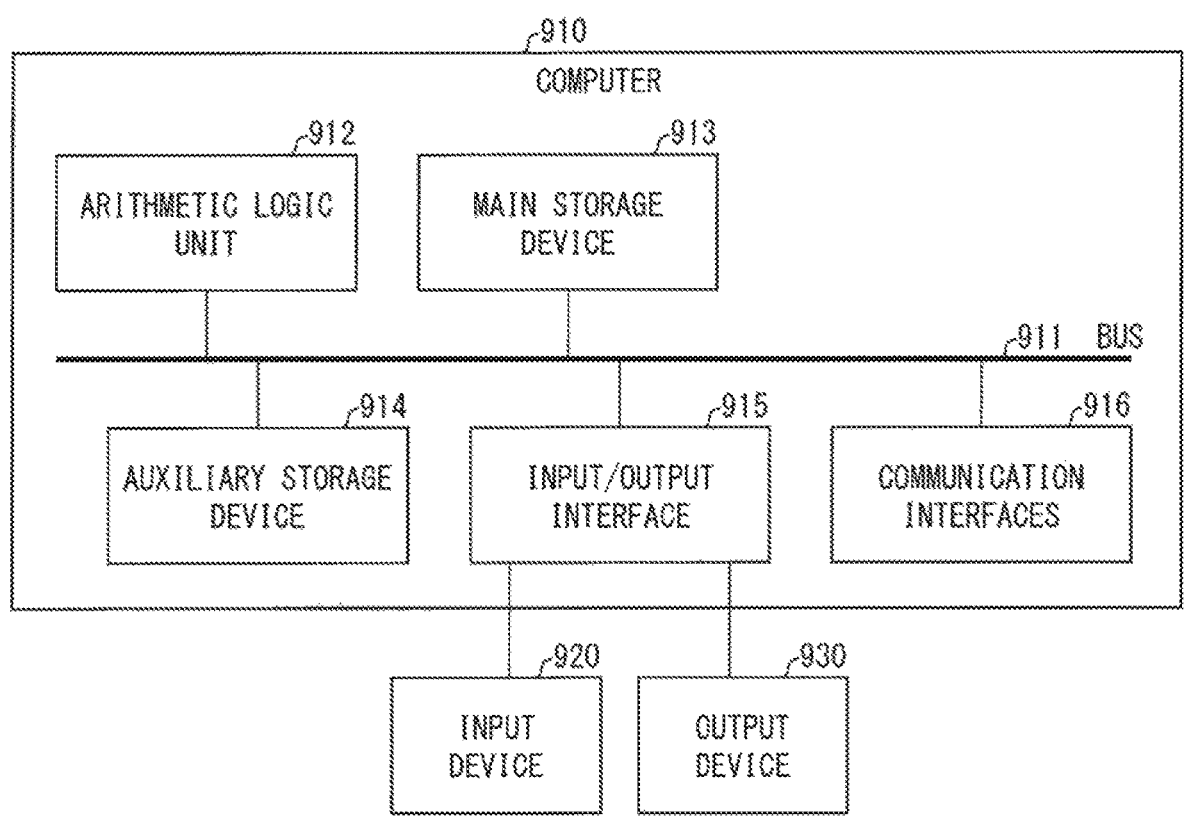
FIG. 26 is a block diagram illustrating a configuration of a computer by which a linking server, a device controlling server, an operation terminal, and a device of each of the above embodiments can be realized.

FIG. 26 is a block diagram illustrating a configuration of a computer 910 by which the linking server 1, the device controlling server 2, the operation terminal 3, and the device can be realized. The computer 910 includes (i) an arithmetic logic unit 912, (ii) a main storage device 913, (iii) an auxiliary storage device 914, (iv) an input/output interface 915, and (v) a communication interface 916 that are connected to each other via a bus 911. Each of the arithmetic logic unit 912, the main storage device 913, and the auxiliary storage device 914 can be realized by, for example, a CPU, a random access memory (RAM), or a hard disk drive. The input/output interface 915 is connected with (i) an input device 920 via which a user inputs various information into the computer 910 and (ii) an output device 930 via which the computer 910 outputs various information to the user. Each of the input device 920 and the output device 930 can be embedded in the computer 910 or can be alternatively connected to the computer 910 (externally connected to the computer 910). For example, the input device 920 can be a keyboard, a mouse, a touch sensor, or the like, and the output device 930 can be a display, a printer, a speaker, or the like. Alternatively, a device having both of a function of the input device 920 and a function of the output device 930 (such as a touch panel into which a touch sensor and a display are integrated) can be employed. The communication interface 916 is an interface via which the computer 910 communicates with an external device.

The auxiliary storage device 914 stores various programs for causing the computer 910 to operate as the linking server 1, the device controlling server 2, the operation terminal 3, or the device 4. The arithmetic Logic unit 912 causes the computer 910 to operate as sections included in the linking server 1, the device controlling server 2, the operation terminal 3, or the device 4 by (i) loading, onto the main storage device 913, the programs stored in the auxiliary storage device 914 and (ii) executing instructions carried out in the programs. Note that a recording medium which is included in the auxiliary storage device 914 for recording information, such as the various programs, only needs to be a computer-readable "non-transitory tangible medium." Examples of the recording medium include tapes, disks, cards, semiconductor memories, and programmable logic circuits.

The various programs can be obtained from outside of the computer 910. In such a case, the various programs can be obtained via any transmission medium (such as a communication network or a broadcast wave). The present invention can also be achieved in the form of a computer data signal in which the various programs are embodied via electronic transmission and which is embedded in a carrier wave.

[Recap]

A linking system (7) in accordance with Aspect 1 of the present invention includes: an information providing server (5); a device controlling server (2); a linking server (1); and one or more control-target devices (device 4), the linking server being configured to cause an operation to be carried out in accordance with a linking rule in which a trigger is associated with the operation, the trigger being predetermined information being transmitted from the information providing server to the linking server, the device controlling server being configured such that, in a case where the device controlling server has received from the linking server an instruction for carrying out the operation in accordance with the linking rule, the device controlling server transmits a command to carry out the operation to at least one control-target device, the at least one control-target device having been identified by the device controlling server from among the one or more control-target devices in accordance with at least one of (i) the operation specified in the linking rule and (ii) a user specified in the linking rule.

With the above configuration, the device controlling server transmits a command to carry out an operation to a control-target device which has been identified by the device controlling server in accordance with at least one of (i) the operation specified in the linking rule and (ii) a user specified in the linking rule. As such, with the above configuration, by generating a linking rule specifying an operation or a user, a user can cause a control-target device corresponding to at least one of (i) the specified operation and (ii) the specified user to carry out the specified operation, without designating the control-target device. The above configuration therefore brings about the effect of making it possible to cause an appropriate control-target device to carry out an operation desired by the user without requiring the user to perform a troublesome operation for designating the control-target device.

In Aspect 2 of the present invention, the linking system of Aspect 1 can be arranged such that: the one or more control-target devices include a plurality of control-target devices which are capable of carrying out the operation; and the device controlling server is configured to transmit the command to carry out the operation to whichever of the plurality of control-target devices first detects a user for which the operation is to be carried out.

With the above configuration, a command to carry out an operation is transmitted to a control-target device which is the first to detect the user for which the operation is to be carried out. The configuration therefore makes it possible to cause a control-target device which has detected a user to promptly carry out an operation for the user.

In Aspect 3 of the present invention, the linking system of Aspect 1 or Aspect 2 can be arranged such that: the operation specified in the linking rule is output of a predetermined message specified in the linking rule; and the device controlling server is configured to transmit, to the one or more control-target devices, at least one of (i) a command to carry out an operation of outputting the message via display and (ii) a command to carry out an operation of outputting the message via audio output.

The above configuration makes it possible to cause a control-target device to output a message in accordance with what functions the control-target device has.

A device controlling server (2) in accordance with Aspect 4 of the present invention is a device controlling server for causing one or more control-target devices (devices 4) to carry out an operation which is predetermined, the device controlling server being controlled by a linking server (1) in accordance with a linking rule in which a trigger is associated with the operation, the trigger being predetermined information being transmitted from an information providing server (5) to the linking server, the device controlling server including: a device identifying section (205) configured such that, in a case where the device identifying section has received from the linking server an instruction for carrying out the operation in accordance with the linking rule, the device identifying section identifies those of the one or more control-target devices which correspond to at least one of (i) the operation specified in the linking rule and (ii) a user specified in the linking rule; and a device controlling section (204) configured to transmit, to those of the one or more control-target devices which have been identified by the device identifying section, a command to carry out the operation. The above configuration brings about effects similar to those of Aspect 1 above.

In Aspect 5 of the present invention, the device controlling server of Aspect 4 can be arranged so as to further include: a device-related-information acquiring section (207) configured to acquire at least one of (i) information relating to the one or more control-target devices and (ii) information relating to a user of the one or more control-target device; and an instruction content changing section (209) configured such that, in a case where information acquired by the device-related-information acquiring section satisfies predetermined condition, the instruction content changing section (i) changes content of the command to carry out the operation transmitted by the device controlling section or (ii) causes the device controlling section to skip transmission of the command to carry out the operation.

With the above configuration, in a case where information acquired by a device-related-information acquiring section satisfies a predetermined condition, an instruction content changing section (i) changes content of a command to carry out an operation transmitted by a device controlling section or (ii) causes the device controlling section to skip transmission of the command to carry out the operation. This configuration therefore makes it possible to, for example, cause the device controlling section to transmit a command to execute an operation which command is in accordance with at least one of (i) information relating to a control-target device and (ii) information relating to a user of the control-target device. The configuration also makes it possible to, for example, cause the device controlling section to skip transmission of a command to execute an operation when it is preferable for the command not to be transmitted.

A control-target device (device 4) in accordance with Aspect 6 of the present invention is a control-target device which carries out an operation in accordance with control by a device controlling server (2), the device controlling server being controlled by a linking server (1) in accordance with a linking rule in which a trigger is associated with the operation, the trigger being predetermined information being transmitted from an information providing server (5)

to the linking server, the device controlling server being configured such that, in a case where the device controlling server has received from the linking server an instruction for carrying out the operation in accordance with the linking rule, the device controlling server transmits a command to carry out the operation to at least one control-target device, the at least one control-target device having been identified by the device controlling server from among one or more control-target devices in accordance with at least one of (i) the operation specified in the linking rule and (ii) a user specified in the linking rule, the control-target device including: an operation execution section (voice output control section 401) configured to carry out the operation in accordance with the control by the device controlling server, the control by the device controlling server being in accordance with the linking rule.

The above configuration makes it possible to for the control-target device to carry out an operation specified in a linking rule in a case where (i) the control-target device is capable of carrying out the operation and (ii) the device controlling server has designated the control-target device as a recipient of a command to carry out the operation.

A terminal device (operation terminal 3) in accordance with Aspect 7 of the present invention is a terminal device which communicates with a linking server (1), the linking server being configured to control a device controlling server (2), in accordance with a linking rule in which a trigger is associated with an operation, so that the device controlling server causes a control-target device (device 4) to carry out the operation, the trigger being predetermined information being transmitted from an information providing server (5) to the linking server, the terminal device including a link setting section (301) configured to cause the linking server to generate the linking rule, in which linking rule the control-target device to carry out the operation is not specified, the device controlling server being configured to identify, as a device to carry out the operation, a control-target device which corresponds to at least one of (i) the operation specified in the linking rule and (ii) a user specified in the linking rule.

Similarly to Aspect 1, the above configuration makes it possible to cause an appropriate control-target device to carry out an operation desired by the user without requiring the user to perform a troublesome operation for designating the control-target device.

A linking system (7) accordance with Aspect 8 of the present invention includes: an information providing server (5); a device controlling server (2), a linking server (1); a control-target device (device 4); and a terminal device (operation terminal 3), the linking server being configured to cause the control-target device to carry out an operation in accordance with a linking rule in which a trigger is associated with the operation, the trigger being predetermined information being transmitted from the information providing server to the linking server, the terminal device being configured to notify the device controlling server of whether or not to cause the control-target device to carry out the operation, the device controlling server being configured to (i) receive, from the linking server, an instruction for carrying out the operation in accordance with the linking rule and (ii) transmit, to the control-target device, a command to carry out the operation in accordance with a notification, from the terminal device, to cause the control-target device to carry out the operation.

With the above configuration, a device controlling server is configured to (i) receive, from a linking server, an instruction for carrying out an operation in accordance with a linking rule and (ii) transmit, to a control-target device, a command to carry out the operation in accordance with a notification, from a terminal device, to cause the control-target device to carry out the operation. The configuration therefore makes it possible to cause an operation to be carried out only in a case where the user of a terminal device desires the operation to be carried out.

In Aspect 9 of the present invention, the linking system (7) of Aspect 8 can be arranged such that: the linking server is configured to transmit, to the device controlling server, origin information which indicates at least one of (a) the linking rule specifying the operation, (b) the trigger specified in the linking rule, and (c) information relating to the information providing server; and the device controlling server is configured to transmit the origin information to (i) the control-target device which will carry out the operation or (ii) the terminal device.

With the above configuration, a linking server transmits origin information to a device controlling server, and the device controlling server transmits the origin information to (i) a control-target device which will carry out an operation or (ii) a terminal device. This makes it possible to allow a user of the control-target device or a user of the terminal device to confirm how the operation originated.

A linking system (7) in accordance with Aspect 10 of the present invention includes: an information providing server (5); a device controlling server (2); a linking server (1); and one or more control-target devices (device 4), the linking server being configured to (i) generate a linking rule in which a trigger is associated with an operation and (ii) cause the device controlling server to cause the one or more control-target devices to carry out the operation in accordance with the linking rule thus generated, the trigger being predetermined information being transmitted from the information providing server to the linking server, the operation being an operation of the one or more control-target devices in accordance with control by the device controlling server, the linking server generating the linking rule for causing those of the one or more control-target devices which are related to a group to which a user belongs to carry out the operation, the device controlling server being configured to transmit, in accordance with control by the linking server which control is in accordance with the linking rule, a command to carry out the operation to those of the one or more control-target devices which are related to the group.

With the above configuration, a linking server generates a linking rule for causing one or more control-target devices which are related to a group to which a user belongs to carry out an operation, and a device controlling server transmits, in accordance with control by the linking server which control is in accordance with the linking rule, a command to carry out the operation to the one or more control-target devices which are related to the group. As such, it is possible to generate not only a linking rule in which an operation is carried out by a control-target device related to the user, but also a linking rule in which an operation is carried out by a control-target device related to the group to which the user belongs. In other words, the above configuration makes it possible to generate a greater variety of rules as compared to a case where a linking rule is generated for causing an operation to be carried out by a control-target device relating to only one user. This makes it possible to cause a variety of control-target devices to carry out an operation.

In Aspect 11 of the present invention, the linking system of Aspect 10 can be arranged such that: the device controlling server transmits, to the linking server, a list of those of the one or more control-target devices which are related to the group; and the linking server generates a linking rule for causing an operation to be carried out to a control-target device selected by the user from among those of the one or more control-target devices on the list.

With the above configuration, a list received from a device controlling server is used to allow a user to select a control-target device. This makes it possible to allow the user to select a control-target device related to a group without group management being performed on a linking server side.

In Aspect 12 of the present invention, the linking system of Aspect 10 or Aspect 11 can be arranged such that: the device controlling server stores (i) group management information (212) which indicates members of the group and (ii) device management information (213) which indicates control-target devices relating to each of the members.

With the above configuration, a device controlling server stores group management information and device management information. As such, by referring to this management information, the device controlling server can (i) identify control-target devices relating to a group to which a user attempting to generate a linking rule belongs and (ii) generate a list of the control-target devices thus identified.

A device controlling server (2) in accordance with Aspect 13 of the present invention is a device controlling server for causing one or more control-target devices (devices 4) to carry out an operation which is predetermined, the device controlling server being controlled by a linking server (1) in accordance with a linking rule in which a trigger is associated with the operation, the trigger being predetermined information being transmitted from an information providing server (5) to the linking server, the operation being an operation of the one or more control-target devices in accordance with control by the device controlling server, the device controlling server including: an information receiving section configured to receive user identification information from the linking server; and an information transmitting section configured to transmit, to the linking server, a list of those of the one or more control-target devices which are related to a group to which a user indicated by the user identification information belongs.

With the above configuration, an information receiving section receives user identification information from a linking server, and an information transmitting section transmits, to the linking server, a list of one or more control-target devices which are related to a group to which a user indicated by the user identification information belongs. As such, with the linking server, it is possible to (i) display, to the user, control-target devices included in the list and (ii) allow the user to select a desired control-target device therefrom. The above configuration therefore makes it possible to generate a greater variety of rules as compared to a case where a linking rule is generated for causing an operation to be carried out by a control-target device relating to only one user. This makes it possible to cause a variety of control-target devices to carry out an operation.

In Aspect 14 of the present invention, the device controlling server of Aspect 13 can be arranged so as to further include: device controlling section configured to transmit, in accordance with control by the linking server which control is in accordance with the linking rule, command to carry out the operation to those of the one or more control-target devices which are related to the group; a device-related-information acquiring section configured to acquire at least one of (i) information relating to the one or more control-target devices and (ii) information relating to a user of the one or more control-target devices; and an instruction content changing section configured such that, in a case where the device-related-information acquiring section has acquired predetermined information, the instruction content changing section (i) changes content of the command to carry out the operation transmitted by the device controlling section or (ii) causes the device controlling section to skip transmission of the command to carry out the operation.

With the above configuration, in a case a device-related-information acquiring section has acquired predetermined information, an instruction content changing section (i) changes content of a command to carry out an operation transmitted by a device controlling section or (ii) causes the device controlling section to skip transmission of the command to carry out the operation. This configuration therefore makes it possible to cause the device controlling section to transmit a command to execute an operation which command is in accordance with at least one of (i) information relating to a control-target device and (ii) information relating to a user of the control-target device. The configuration also makes it possible to cause the device controlling section to skip transmission of a command to execute an operation when it is preferable for the command not to be transmitted.

A control-target device (device 4) in accordance with Aspect 15 of the present invention is a control-target device which carries out an operation in accordance with control by a device controlling server (2), the device controlling server being controlled by a linking server (1) in accordance with a linking rule in which a trigger is associated with the operation, the trigger being predetermined information being transmitted from an information providing server to the linking server, the operation being an operation of the control-target device in accordance with control by the device controlling server, the linking server generating the linking rule for causing at least one control-target device which is related to a group to which a user belongs to carry out the operation, the device controlling server being configured to transmit, in accordance with control by the linking server which control is in accordance with the linking rule, a command to carry out the operation to the at least one control-target device which is related to the group, the control-target device including: an operation execution section configured to carry out the operation in accordance with the control by the device controlling server, the control by the device controlling server being in accordance with the linking rule.

With the above configuration, the control-target device carries out an operation specified in the linking rule in a case where the control-target device is (i) related to a group to which the user belongs and (ii) selected by the user as a device to carry out the operation. In other words, the control-target device can carry out an operation specified in the linking rule in a case where the control-target device is a control-target device desired by the user out of control-target devices relating to the group to which the user belongs.

A terminal device (operation terminal 3) in accordance with Aspect 16 of the present invention is a terminal device which communicates with a linking server (1), the linking server being configured to cause, in accordance with a linking rule in which a trigger and an operation are associated, a device controlling server (2) to cause one or more control-target devices (devices 4) to carry out the operation, the trigger being predetermined information being transmitted from an information providing server to the linking server, the terminal device including: a device information display section (link setting section 301) configured to acquire information from the linking server and display the information, the information indicating, out of the one or more control-target devices which the device controlling server can control, one or more control-target devices which are related to a group to which a user of the terminal device belongs; and a link setting section (301) configured to cause the linking server to generate a linking rule for causing an operation to be carried out by a selected control-target device, the selected control-target device being selected by the user via the terminal device from among the one or more control-target devices which are related to the group.

With the above configuration, a device information display section acquires information from a linking server and displays the information, the information indicating, out of control-target devices which the device controlling server can control, one or more control-target devices which are related to a group to which a user of a terminal device belongs. Further, with the above configuration, a link setting section causes a linking server to generate a linking rule for causing an operation to be carried out by a selected control-target device, the selected control-target device being selected by the user via the terminal device from among the one or more control-target devices which are related to the group. As such, it is possible cause the linking server to generate not only a linking rule in which an operation is carried out by a control-target device related to the user of the terminal device, but also a linking rule in which an operation is carried out by a control-target device related to the group to which the user belongs. The configuration therefore enables the generation of a variety of linking rules.

Note that prior to acquiring, from the linking server, the information indicating control-target devices relating to the group, the terminal device may accept authentication information inputted by the user, the authentication information being for user authentication for the device controlling server. The terminal device may transmit the authentication information thus accepted to the device controlling server. This transmission may be carried out via the linking server but is not limited to such. The device controlling server may transmit to the linking server information indicating control-target devices related to the group, in a case where authentication using the authentication information was successful. The terminal device may accept input from the user which input designates the trigger and the operation and (ii) notify the linking server of the input. Such configurations make it possible to cause the linking server to generate a linking rule in which a trigger, a device, and an operation, each of which have been inputted via the terminal device, are associated with each other.

In Aspect 17 of the present invention, the terminal device of Aspect 16 can be arranged such that: the device information display section (i) allows the user of the terminal device to select at least one member out of members belonging to the group, (ii) obtains from the linking server information indicating one or more control-target devices which relate to the at least one member thus selected, and (iii) displays the information indicating the one or more control-target devices which relate to the at least one member.

With the above configuration, the user selects a desired member, and accordingly, information displayed by the terminal device is narrowed down to information indicating control-target devices which relate to that member. The above configuration therefore facilitates the user's selection of a control-target device.

A linking system (7) in accordance with Aspect 18 of the present invention includes: an information providing server (information providing server 5/device controlling server 2/device monitoring server 9); an operation execution server (device controlling server 2/operation execution server 8); a linking server (1); and one or more devices (4, 6), the information providing server being configured to transmit, to the linking server, information relating to those of the one or more devices which are related to a group to which a user belongs, the linking server being configured to cause the operation execution server to carry out a predetermined operation in response to a trigger, the trigger being the linking server receiving, from the information providing server, predetermined information relating to the one or more devices.

With the above configuration, not only is it possible to cause a predetermined operation to be triggered by predetermined information relating to a device related to a user; it is also possible to cause a predetermined operation to be triggered by predetermined information relating to a device related to a group to which the user belongs. In other words, the above configuration makes it possible to cause an operation execution server to carry out a predetermined operation in response to a greater variety of triggers, as compared to a case where a trigger is set as being predetermined information relating to a device which relates to only one user.

In Aspect 19 of the present invention, the linking system of Aspect 18 can be arranged such that: the information providing server transmits, to the linking server, information indicating an operational status of those of the one or more devices which are related to the group to which the user belongs; and the linking server causes the operation execution server to carry out a predetermined operation in response to a trigger, the trigger being that the operational status indicated in the information received from the information providing server is a predetermined operational status.

The above configuration makes it possible to cause an operation execution server to carry out a predetermined operation in response to a trigger, the trigger being that an operational status of a device relating to a group to which a user belongs is a predetermined operational status.

In Aspect 20 of the present invention, the linking system of Aspect 18 can be arranged such that: the group includes a plurality of users who use the one or more devices; the information providing server (i) associates (a) information relating to a user among the plurality of users who has used the one or more devices (6) with (b) identification information for the user who has used the one or more devices and (ii) transmits the information thus associated with the identification information to the linking server; and the linking server causes the operation execution server to carry out a predetermined operation in response to a trigger, the trigger being the linking server receiving, from the information providing server, predetermined information associated with identification information for a predetermined user.

The above configuration makes it possible to cause an operation execution server to carry out a predetermined operation in response to a trigger, the trigger being information related to a predetermined user out of a plurality of users who share a device. This makes it possible to prevent the predetermined operation from being carried out in the case of information relating to other users.

The information providing server, the device controlling server, the linking server, the control-target device, and the terminal device in accordance with the aspects of the present invention may be realized by a computer. In such a case, the present invention also encompasses a control program for the information providing server, a control program for the device controlling server, a control program for the linking server, a control program for the control-target device, and a control program for the terminal device which programs cause a computer to operate as each section (software element) of the device controlling server, the linking server, the control-target device, and the terminal device so as to realize the information providing server, the device controlling server, the linking server, the control-target device, and the terminal device by the computer. In such a case, the present invention also encompasses a computer-readable storage medium in which the control programs are stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Linking server
2 Device controlling server (operation execution server/information providing server)
3 Operation terminal (terminal device)
4 Device (control-target device)
5 Information providing server
6 Device
7 Linking system
8 Operation execution server
9 Device monitoring server (information providing server)
202 Authentication section (in formation receiving section)
203 Information transmitting section
204 Device controlling section
205 Device identifying section
207 Device-related-information acquiring section
209 Instruction content changing section
212 Group management information
213 Device management information
301 Link setting section
401 Voice output control section (operation execution section)

The invention claimed is:

1. A linking system comprising:
an information providing server;
a device controlling server,
a linking server; and
a plurality of control-target devices,
the linking server being configured to cause an operation to be carried out in accordance with a linking rule in which a trigger is associated with the operation,
the plurality of control-target devices being not designated in the linking rule,
the trigger being predetermined information being transmitted from the information providing server to the linking server,
the device controlling server comprising:
  a memory that stores instructions; and
  a processor that executes the instructions stored in the memory to:
    in a case where the device controlling server has received from the linking server an instruction for carrying out the operation in accordance with the linking rule,
    (i) identify, with reference to information in which devices are associated with users, a plurality of devices to be controlled from among the plurality of control-target devices based on a target user designated by the linking rule and is controlled by the device controlling server,
    (ii) select one or more control-target devices from among the plurality of devices which have been identified, the one or more selected control-target devices having been selected by the device controlling server from among the plurality of devices to be controlled in accordance with information received from each of the plurality of devices to be controlled, the information indicates an operational status of a device from which the information was transmitted, and
    (iii) transmit a command to carry out the operation to the one or more selected control-target devices.

2. The linking system according to claim 1, wherein:
the plurality of control-target devices include a plurality of operation-capable control-target devices which are capable of carrying out the operation; and
the device controlling server is configured to transmit the command to carry out the operation to Whichever of the plurality of operation-capable control-target devices first detects a user for which the operation is to be carried out.

3. The linking system according to claim 1, wherein: the operation specified in the linking rule is output of a predetermined message specified in the linking rule and the device controlling server is configured to transmit, to one or more control-target devices, at least one of (i) a command to carry out an operation of outputting the predetermined message via display and (ii) a command to carry out an operation of outputting the predetermined message via audio output.

4. The linking system according to claim 1, wherein: in the information in which the devices are associated with the users, there is one of the plurality of control target devices which is associated with a group of the users.

5. A device controlling server for causing a plurality of control-target devices to carry out an operation which is predetermined,
the device controlling server comprising:
a memory that stores instructions; and
a processor that executes the instructions stored in the memory to:
  in a case where an instruction for carrying out the operation in accordance with a linking rule is received from a linking server, identify, with reference to information in which devices are associated with users, a plurality of devices from among the plurality of control-target devices based on a target user designated by the linking rule and is controlled by the device controlling server;
  select one or more recipient devices from among the plurality of devices which have been identified, the one or more recipient devices being selected in accordance with information received from each of the plurality of devices which have been identified, the information indicates an operational status of a control-target device from which the information was transmitted; and
  transmit to the one or more recipient devices a command to carry out the operation,
wherein the device controlling server being controlled by the linking server in accordance with the linking rule in which a trigger is associated with the operation, and the plurality of control-target devices being not designated in the linking rule, the trigger being a predetermined information being transmitted from an information providing server to the linking server.

6. The device controlling server according to claim 5, the processor further executes instructions to:
acquire information relating to one or more of the plurality of control-target devices; and in a case Where the information acquired satisfies a predetermined condition, (i) change content of the command to carry out the operation or (ii) cause to skip transmission of the command to carry out the operation.

7. A linking system comprising:
an information providing server;
a device controlling server,
a linking server;
a plurality of control-target devices; and
a terminal device,
the linking server being configured to cause the plurality of control-target devices to carry out an operation in accordance with a linking rule in which a trigger is associated with the operation, the plurality of control-target devices being not designated in the linking rule,
the trigger being predetermined information being transmitted from the information providing server to the linking server,
the terminal device being configured to notify the device controlling server of whether or not to cause the plurality of control-target devices to carry out the operation,
the device controlling server comprising:
a memory that stores instructions; and
a processor that executes the instructions stored in the memory to:
in a case where the device controlling server receives, from the linking server, an instruction for carrying out the operation in accordance with the linking rule, (i) identify, with reference to information in which devices are associated with users, a plurality of devices from among the plurality of control-target devices based on a target user designated by the linking rule and is controlled by the device controlling server,
(ii) select one or more recipient devices from among the plurality of devices which have been identified, the one or more recipient devices being selected in accordance with information received from each of the plurality of devices which have been identified, the information indicates an operational status of a control-target device from which the information was transmitted, and
(iii) transmit to the one or more recipient devices, a command to carry out the operation in accordance with a notification, from the terminal device, to cause the one or more recipient devices to carry out the operation.

8. The linking system according to claim 7, wherein: the linking server is configured to transmit, to the device controlling server, origin information which indicates at least one of (a) the linking rule specifying the operation, (b) the trigger specified in the linking rule, and (c) information relating to the information providing server; and
the device controlling server is configured to transmit the origin information to (i) the one or more recipient devices which will carry out the operation or (ii) the terminal device.

* * * * *